(12) United States Patent
Sybert et al.

(10) Patent No.: US 10,017,641 B2
(45) Date of Patent: Jul. 10, 2018

(54) COMPATIBILIZED COMPOSITIONS, ARTICLES FORMED THEREFROM, AND METHODS OF MANUFACTURE THEREOF

(71) Applicant: SABIC GLOBAL TECHNOLOGIES B.V., Bergen op Zoom (NL)

(72) Inventors: Paul Dean Sybert, Evansville, IN (US); Mark Adrianus Johannes Van Der Mee, Breda (NL); Roland Sebastian Assink, Middelburg (NL); Robert Dirk Van De Grampel, Tholen (NL); Aditya Narayanan, Evansville, IN (US); Feng Cao, Loudonville, NY (US); Kapil Chandrakant Sheth, Evansville, IN (US); Hao Zhou, Newburgh, IN (US); Xiaoyu Sun, Evansville, IN (US); Remco Wirtz, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 130 days.

(21) Appl. No.: 15/110,472

(22) PCT Filed: Jan. 12, 2015

(86) PCT No.: PCT/US2015/011031
§ 371 (c)(1),
(2) Date: Jul. 8, 2016

(87) PCT Pub. No.: WO2015/106204
PCT Pub. Date: Jul. 16, 2015

(65) Prior Publication Data
US 2016/0326366 A1 Nov. 10, 2016

Related U.S. Application Data

(60) Provisional application No. 61/926,245, filed on Jan. 10, 2014, provisional application No. 61/926,948, filed on Jan. 13, 2014, provisional application No. 61/926,953, filed on Jan. 14, 2014, provisional application No. 61/951,432, filed on Mar. 11, 2014.

(51) Int. Cl.
| | |
|---|---|
| *C08G 64/00* | (2006.01) |
| *C08L 69/00* | (2006.01) |
| *C08L 79/08* | (2006.01) |
| *B32B 27/08* | (2006.01) |
| *C08J 5/00* | (2006.01) |
| *C25D 11/02* | (2006.01) |
| *C08K 3/22* | (2006.01) |

(52) U.S. Cl.
CPC .............. *C08L 69/00* (2013.01); *B32B 27/08* (2013.01); *C08J 5/00* (2013.01); *C08L 79/08* (2013.01); *C25D 11/02* (2013.01); *C08J 2369/00* (2013.01); *C08J 2469/00* (2013.01); *C08J 2479/08* (2013.01); *C08K 2003/2241* (2013.01); *C08L 2201/08* (2013.01); *C08L 2203/12* (2013.01); *C08L 2203/14* (2013.01); *C08L 2205/02* (2013.01); *C08L 2205/025* (2013.01); *C08L 2205/03* (2013.01); *C08L 2205/035* (2013.01); *C08L 2205/06* (2013.01); *C08L 2207/04* (2013.01)

(58) Field of Classification Search
USPC .......................... 528/196, 198; 428/411, 412
See application file for complete search history.

(56) References Cited

U.S. PATENT DOCUMENTS

| | | | |
|---|---|---|---|
| 4,387,193 A | 6/1983 | Giles, Jr. | |
| 4,548,997 A | 10/1985 | Mellinger et al. | |
| 4,629,759 A | 12/1986 | Rock | |
| 4,673,708 A | 6/1987 | Rock et al. | |
| 4,816,527 A | 3/1989 | Rock | |
| 5,051,483 A | 9/1991 | Rock et al. | |
| 5,106,915 A | 4/1992 | Rock et al. | |
| 5,387,639 A | 2/1995 | Sybert et al. | |
| 5,986,016 A | 11/1999 | Puyenbroek et al. | |
| 7,321,014 B2 | 1/2008 | Glasgow et al. | |
| 7,452,944 B2 | 11/2008 | Gallucci et al. | |
| 2013/0224462 A1 | 8/2013 | Van Der Mee et al. | |
| 2013/0261202 A1 | 10/2013 | Cao et al. | |
| 2015/0353732 A1* | 12/2015 | Wang ..................... C08L 83/04 524/141 |
| 2016/0333181 A1 | 11/2016 | Sybert et al. | |

FOREIGN PATENT DOCUMENTS

| | | |
|---|---|---|
| CN | 101309973 A | 11/2008 |
| CN | 101981085 A | 2/2011 |
| EP | 0117327 A1 | 9/1984 |
| EP | 0186927 A2 | 12/1984 |
| WO | 9410245 | 5/1994 |

OTHER PUBLICATIONS

International Search Report for International Application No. PCT/US2015/011031, International Application Filing Date Jan. 12, 2015; dated Mar. 24, 2015; 4 pages.
International Search Report for International Application No. PCT/US2015/011042, International Application Filing Date Jan. 12, 2015; dated Mar. 24, 2015; 4 pages.

(Continued)

*Primary Examiner* — Terressa M Boykin
(74) *Attorney, Agent, or Firm* — Cantor Colburn LLP

(57) ABSTRACT

A thermoplastic composition comprises, based on the total weight of the thermoplastic composition, 10 to 45 wt. % of a poly(etherimide); 35 to 90 wt. % of a polycarbonate component comprising a polycarbonate homopolymer, a poly(carbonate-siloxane), or a combination thereof; 0.5 to 20 wt. % of a compatibilizer polycarbonate component comprising a poly(carbonate-arylate ester), a phthalimidine copolycarbonate, or a combination thereof; up to 5 wt. % of an ultraviolet light stabilizer; and 0 to 20 wt. % of $TiO_2$, wherein a sample of the composition has a 50% higher notched Izod impact energy value compared to the composition without the compatibilizer component.

30 Claims, 1 Drawing Sheet

(56) References Cited

OTHER PUBLICATIONS

Written Opinion for International Application No. PCT/US2015/011031, International Application Filing Date Jan. 12, 2015; dated Mar. 24, 2015, 5 pages.
Written Opinion for International Application No. PCT/US2015/011042, International Application Filing Date Jan. 12, 2015; dated Mar. 24, 2015; 5 pages.

* cited by examiner

COMPATIBILIZED COMPOSITIONS, ARTICLES FORMED THEREFROM, AND METHODS OF MANUFACTURE THEREOF

CROSS REFERENCE TO RELATED APPLICATIONS

This application is a National Stage application of PCT/US15/11031, filed Jan. 12, 2015, which claims the benefit of U.S. Provisional Application No. 61/926,245, filed Jan. 10, 2014, U.S. Provisional Application No. 61/926,948, filed Jan. 13, 2014, U.S. Provisional Application No. 61/926,953, filed Jan. 14, 2014, and U.S. Provisional Application No. 61/951,432, filed Mar. 11, 2014, all of which are incorporated by reference in their entirety herein.

BACKGROUND

This disclosure is directed to compatibilized thermoplastic compositions, articles formed therefrom, and their methods of manufacture, and in particular compatibilized thermoplastic compositions with advantageous properties such as improved impact strength, stable color, or low smoke density.

Polycarbonate homopolymers, polycarbonate copolymers, and polyetherimides are useful in a wide variety of applications at least in part because of their good balance of properties, such as moldability, heat resistance and impact properties, among others. Despite extensive research on these materials over the years, there still remains a need in the art for improved thermoplastic compositions that meet increasingly stringent industry standards.

For example, polycarbonates can generate smoke and heat upon burning, which makes them less suitable for applications in mass transportation (aircraft, trains, and ships), as well as in building and construction. Recently, the European Union has approved the introduction of a new harmonized fire standard for rail applications, namely EN-45545, to replace all currently active different standards in each member state, which will become fully active within the next two to three years. This standard will impose stringent requirements on smoke density allowed for materials used in rail interior applications. It is challenging to develop materials that meet stringent smoke density standards in addition to other material requirements. It is particularly challenging to develop materials that meet these requirements and that have good impact properties at the same time.

SUMMARY

In an embodiment, a thermoplastic composition comprises, based on the total weight of the thermoplastic composition, 10 to 45 wt. % of a poly(etherimide); 35 to 90 wt. % of a polycarbonate component comprising a polycarbonate homopolymer, a poly(carbonate-siloxane), or a combination thereof; 0.5 to 20 wt. % of a compatibilizer polycarbonate component comprising a poly(carbonate-arylate ester), a phthalimidine copolycarbonate, or a combination thereof; up to 5 wt. % of an ultraviolet light stabilizer; and 0 to 20 wt. % of $TiO_2$; wherein a sample of the composition has a 50% higher notched Izod impact energy value compared to the composition without the compatibilizer component measured at 23° C. according to ISO 180/1A using a multipurpose test specimen in accordance with ISO 3167 TYPE A.

In another embodiment, an article selected from a molded article, a thermoformed article, an extruded sheet, a foamed article, a printed article, one or more layers of a multi-layer article, a substrate for a coated article, and a substrate for a metallized article comprising the composition.

A method of manufacture of an article, comprising molding, extruding, 3-dimensional printing, or casting the composition to form the article.

The above described and other features are exemplified by the following Figures, Detailed Description, and Examples.

BRIEF DESCRIPTION OF THE DRAWINGS

A description of the figures, which are meant to be exemplary and not limiting, is provided in which.

Figure 1:
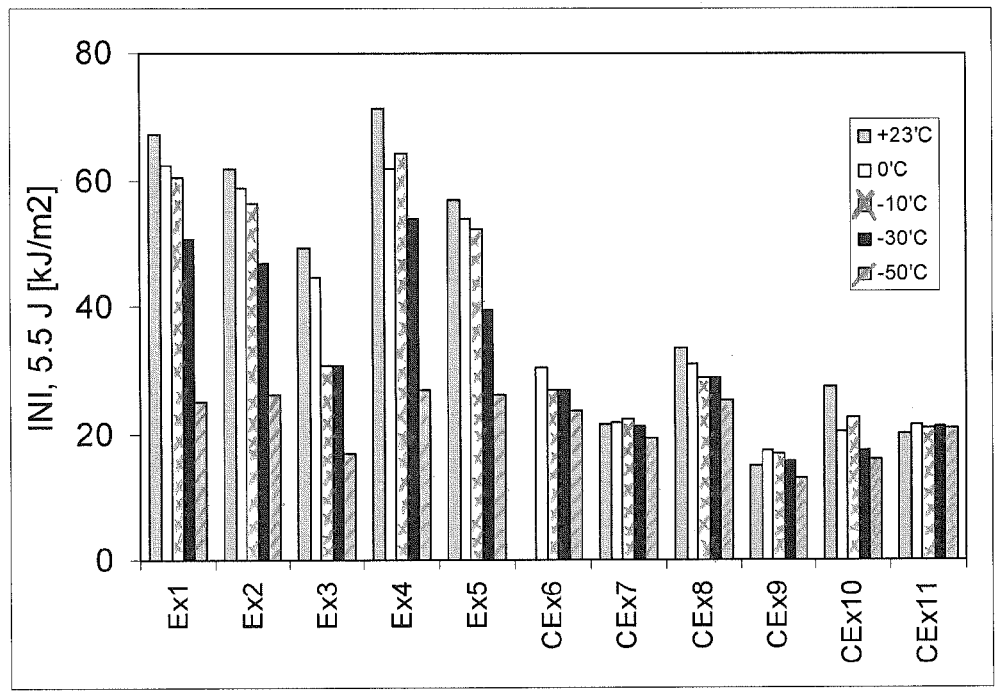
FIG. 1 shows the effect of addition of various polycarbonate copolymers to a polyetherimide/polycarbonate homopolymer/poly(carbonate-siloxane) combination on notched Izod impact resistance measured according to ISO 180/1A using a multipurpose test specimen in accordance with ISO 3167 TYPE A.

The above described and other features are exemplified by the following detailed description and Examples.

DETAILED DESCRIPTION

The inventors hereof have discovered thermoplastic compositions that have a novel combination of properties. The compositions comprise a polycarbonate homopolymer, poly(carbonate-siloxane), or a combination thereof; a polyetherimide; and a specific compatibilizer.

For example, the thermoplastic compositions can have very low smoke density and excellent impact properties at the same time. In particular, the inventors have discovered that addition of a compatibilizer, in particular a small amount of certain polycarbonate copolymers to compositions having a combination of polyetherimide, polycarbonate homopolymer, and poly(carbonate-siloxane), which have low impact resistance and low ductility, unexpectedly results in a significant improvement in these properties. This allows the production of thermoplastic compositions with smoke density DS-4 values below 300 determined according to ISO5659-2 on 3 mm thick samples at 50 kW/m², while at the same time allowing sufficient flow for injection molding of relatively large parts and retaining good impact properties.

The individual components of the compositions are described in more detail below.

The polyetherimide of the thermoplastic composition is of formula (1)

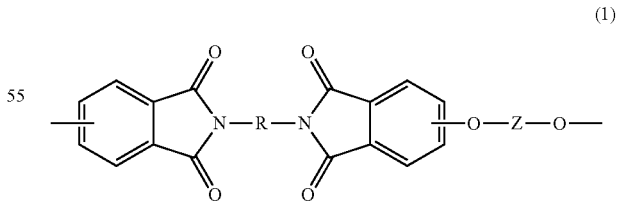

(1)

wherein R is a substituted or unsubstituted divalent organic group having 2 to 20 carbon atoms, for example a substituted or unsubstituted aromatic hydrocarbon group having 6 to 20 carbon atoms or a halogenated derivative thereof, a substituted or unsubstituted, straight or branched chain alkylene group having 2 to 20 carbon atoms, a substituted or unsubstituted cycloalkylene groups having 3 to 20 carbon atoms, or a divalent group of formula (2)

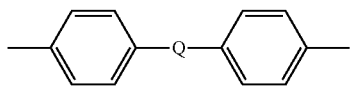

(2)

wherein Q is —O—, —S—, —C(O)—, —SO$_2$—, —SO—, or —C$_y$H$_{2y}$— wherein y is an integer from 1 to 5 or a halogenated derivative thereof.

The group Z in formula (1) is an aromatic C$_{6-24}$ monocyclic or polycyclic group optionally substituted with 1 to 6 C$_{1-8}$ alkyl groups, 1 to 8 halogen atoms, or a combination thereof, wherein the divalent bonds of the —O—Z—O— group are in the 3,3',3,4',4,3', or the 4,4' positions.

In an embodiment, R in formula (1) is a divalent radical of one of the following formulas (3)

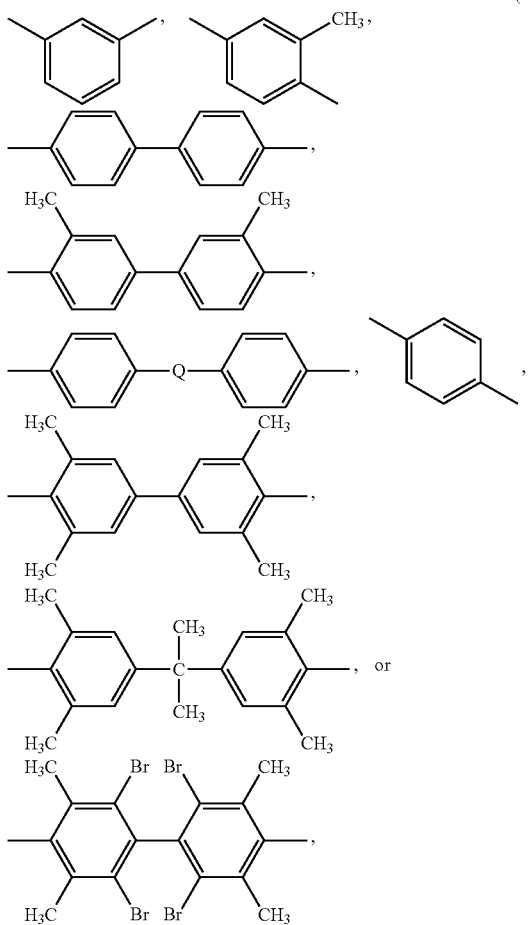

(3)

wherein Q is —O—, —S—, —C(O)—, —SO$_2$—, —SO—, or —C$_y$H$_{2y}$— wherein y is an integer from 1 to 5 or and a halogenated derivative thereof; and Z is a divalent group of formula (4)

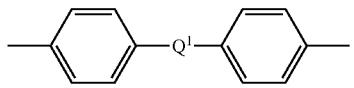

(4)

wherein Q$^1$ is —O—, —S—, —C(O)—, —SO$_2$—, —SO—, or —C$_y$H$_{2y}$— wherein y is an integer from 1 to 5. In an embodiment no halogen substituents are present in the polyetherimide. In specific embodiments, R is meta-phenylene, para-phenylene, or a combination thereof; and Z is 2,2'-bis(4-phenylene)propane. As used herein, a polyetherimide includes a combination of different polyetherimides, each independently having a structure of formula (1).

Polyetherimides can be obtained by polymerization of an aromatic bisanhydride of formula (5)

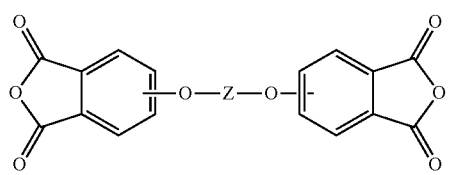

(5)

wherein Z is as described in formula (1), with a diamine of the formula H$_2$N—R—NH$_2$ wherein R is as described in formula (1). Examples of specific aromatic bisanhydrides and organic diamines are disclosed, for example, in U.S. Pat. Nos. 3,972,902 and 4,455,410 incorporated herein by reference in their entirety. Illustrative examples of aromatic bisanhydrides (5) include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures comprising at least one of the foregoing.

Illustrative examples of diamines H$_2$N—R—NH$_2$ include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5- diethylphenyl) methane, bis(4-aminophenyl) propane, 2,4-bis(amino-t-butyl) toluene, bis(p-amino-t-butylphenyl) ether, bis(p-methyl-o-aminophenyl)benzene, bis(p-methyl-o-aminopentyl)benzene, 1,3-diamino-4-isopropylbenzene, bis(4-aminophenyl) sulfide, bis(4-aminophenyl) sulfone, bis (4-aminophenyl) ether and 1,3-bis(3-aminopropyl)tetramethyldisiloxane. Combinations comprising at least one of the foregoing aromatic bisanhydrides can be used. Aromatic diamines are often used, especially m- and p-phenylenediamine, sulfonyl dianiline, and combinations thereof.

As used herein, the term "polycarbonate" refers to compounds having repeating units that are bisphenol carbonate units of formula (6)

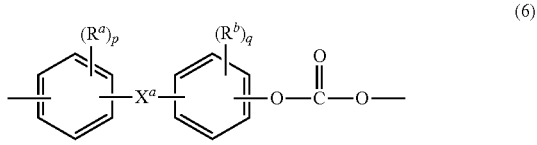

(6)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. Exemplary $X^a$ groups include methylene, ethylidene, neopentylidene, and isopropylidene. The bridging group $X^a$ and the carbonate oxygen atoms of each $C_6$ arylene group can be disposed ortho, meta, or para (specifically para) to each other on the $C_6$ arylene group.

In a specific embodiment, $R^a$ and $R^b$ are each independently a $C_{1-3}$ alkyl group, p and q are each independently 0 to 1, and $X^a$ is a single bond, —O—, —S(O)—, —S(O)$_2$—, —C(O)—, a $C_{1-9}$ alkylidene of formula —C($R^c$)($R^d$)— wherein $R^c$ and $R^d$ are each independently hydrogen or $C_{1-8}$ alkyl, or a group of the formula —C(=$R^e$)— wherein $R^e$ is a divalent $C_{1-9}$ hydrocarbon group. In another specific embodiment, $R^a$ and $R^b$ are each independently a methyl group, p and q are each independently 0 to 1, and $X^a$ is a single bond, a $C_{1-7}$ alkylidene of formula —C($R^c$)($R^d$)— wherein $R^c$ and $R^d$ are each independently hydrogen or $C_{1-6}$ alkyl. In an embodiment, p and q is each 1, and $R^a$ and $R^b$ are each a $C_{1-3}$ alkyl group, specifically methyl, disposed meta to the oxygen on each ring. The bisphenol carbonate units (6) can be derived from bisphenol A, where p and q are both 0 and $X^a$ is isopropylidene.

The polycarbonate units can be produced from dihydroxy compounds of the formula (7)

HO—$R^1$—OH     (7)

wherein $R^1$ is a bridging moiety. Thus, the bisphenol carbonate units (6) are generally produced from the corresponding bisphenol compounds of formula (8)

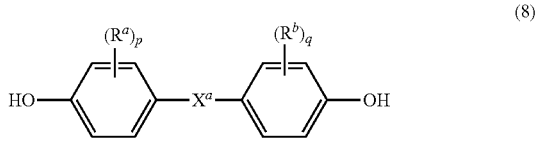

(8)

wherein $R^a$ and $R^b$, p and q, and $X^a$ are the same as in formula (6). Some illustrative examples of specific bisphenol compounds that can be used to produce units (6) include 4,4'-dihydroxybiphenyl, bis(4-hydroxyphenyl)methane, 1,2-bis(4-hydroxyphenyl)ethane, 2-(4-hydroxyphenyl)-2-(3-hydroxyphenyl)propane, 1,2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, bis (4-hydroxyphenyl)ether, bis(4-hydroxyphenyl)sulfide, bis (4-hydroxyphenyl)sulfoxide, bis(4-hydroxyphenyl)sulfone, or a combination comprising at least one of the foregoing bisphenolic compounds.

Specific examples of bisphenol compounds that can be used in the production of bisphenol carbonate units (6) include 1,1-bis(4-hydroxyphenyl) methane, 1,1-bis(4-hydroxyphenyl) ethane, 2,2-bis(4-hydroxyphenyl) propane ("bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, and combinations comprising at least one of the foregoing bisphenol compounds.

A polycarbonate homopolymer refers to a polymer comprising only one type of carbonate units of formula (6). In a specific embodiment, the polycarbonate homopolymer is a linear homopolymer comprising bisphenol A carbonate units.

The poly(carbonate-siloxane) copolymers, also referred to as "PC-siloxane" or "PC—Si" can contain bisphenol carbonate units (6) and repeating siloxane units (also known as "diorganosiloxane units"). The siloxane units can be polysiloxane units of formula (9)

(9)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R groups can be used in the same copolymer. In an embodiment, the polysiloxane comprises R groups that have minimal hydrocarbon content. In a specific embodiment, an R group with a minimal hydrocarbon content is a methyl group.

The average value of E in formula (9) can vary widely depending on the type and relative amount of each component in the polycarbonate composition, whether the polymer is linear, branched or a graft copolymer, the desired properties of the composition, and like considerations. In an embodiment, E has an average value of 2 to 500, 2 to 200, or 5 to 120, 10 to 100, 10 to 80, 2 to 30, or 30 to 80. In an embodiment E has an average value of 16 to 50, more specifically 20 to 45, and even more specifically 25 to 45. In another embodiment, E has an average value of 4 to 50, 4 to 15, specifically 5 to 15, more specifically 6 to 15, and still more specifically 7 to 10. In an embodiment, the polysiloxane units are structural units of formula (9a)

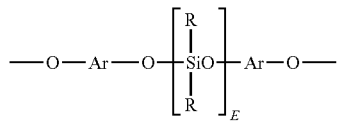
(9a)

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (9a) can be derived from a $C_{6-30}$ dihydroxy aromatic compound, for example a bisphenol compound as described above or a monoaryl dihydroxy compound. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl)cyclohexane, bis(4-hydroxyphenyl sulfide), and 1,1-bis(4-hydroxy-t-butylphenyl) propane. Combinations comprising at least one of the foregoing dihydroxy compounds can also be used. In an embodiment, the dihydroxy aromatic compound is unsubstituted, or is does not contain non-aromatic hydrocarbyl substituents such as alkyl, alkoxy, or alkylene substituents.

In a specific embodiment, where Ar is derived from resorcinol, the polysiloxane units are of the formula (9a-1)

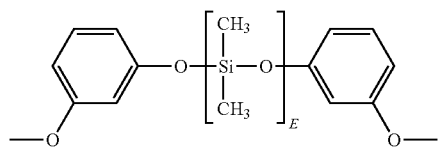
(9a-1)

or, where Ar is derived from bisphenol A, the polysiloxane has the formula (9a-2)

or a combination comprising at least one of the foregoing can be used, wherein E has an average value as described above, specifically an average value of 2 to 200.

In another embodiment, polydiorganosiloxane units are units of formula (9b)

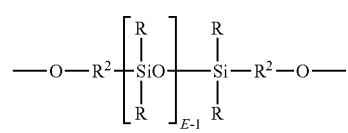
(9b)

wherein R and E are as described for formula (9), and each $R^2$ is independently a $C_{1-30}$ or $C_{2-14}$ hydrocarbylene group, for example, a divalent $C_{1-30}$ alkylene or $C_{7-30}$ arylenealkylene. In a specific embodiment, where $R^2$ is $C_{7-30}$ arylene-alkylene, the polydiorganosiloxane units are of formula (9b-1)

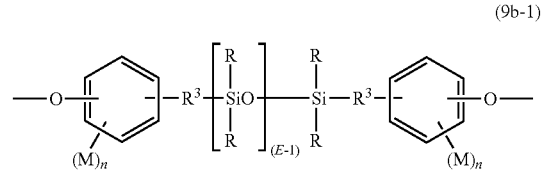
(9b-1)

wherein R and E are as defined for formula (9), and each $R^3$ is independently a divalent $C_{2-8}$ aliphatic group. Each M can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl. The foregoing poly(carbonate-siloxane) copolymers can be manufactured by the methods described in U.S. Pat. No. 6,072,011 to Hoover, for example.

In a specific embodiment, the polysiloxane units are eugenol-capped polysiloxane units of formula (9b-2)

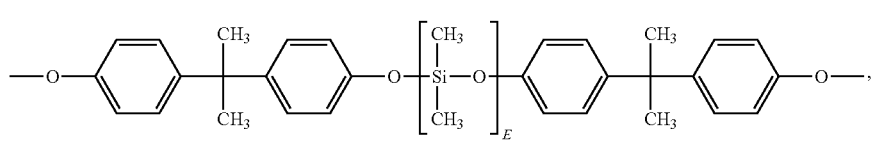
(9a-2)

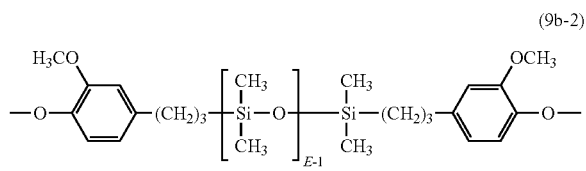

(9b-2)

where E has an average value as described above, specifically 2 to 200, 2 to 100, 2 to 90, 2 to 80, or 2 to 30, 20 to 20, or 30 to 80. In another specific embodiment, the polysiloxane units are of formula (9b-3) or (9b-4)

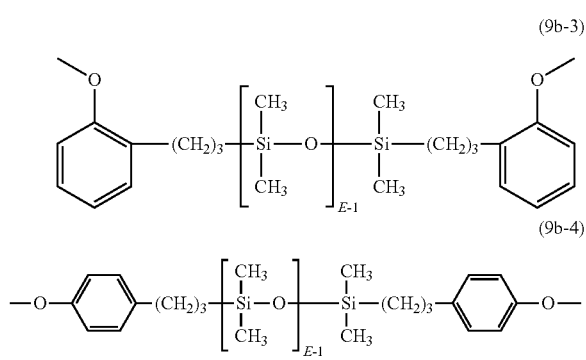

where E has an average value as defined above, specifically an average value of 2 to 200, 2 to 100, 2 to 90, 2 to 80, or 2 to 30, 20 to 20, or 30 to 80.

The relative amount of carbonate units (6) and polysiloxane units (9) in the PC-siloxane copolymers depends on the desired properties of the polycarbonate composition, such as impact, smoke density, heat release, and melt viscosity. In particular the polycarbonate copolymer is selected to have an average value of E that provides good impact and/or transparency properties, as well as to provide the desired weight percent of siloxane units in the polycarbonate composition. For example, the polycarbonate copolymers can comprise siloxane units in an amount of 0.1 to 60 weight percent (wt. %), specifically 0.5 to 55 wt. %, or 0.5 to 45 wt. %, based on the total weight of the polymers in the polycarbonate composition, with the proviso that the siloxane units are provided by polysiloxane units covalently bonded in the polymer backbone of the polycarbonate copolymer. As used herein, a poly(carbonate-siloxane) includes a combination of different poly(carbonate-siloxane)s, each independently containing bisphenol carbonate units (6) and repeating siloxane units (9), (9b-1), (9b-2), (9b-3) or (9b-4). In an embodiment, the poly(carbonate-siloxane)s in the PC—Si combination can have different siloxane contents.

A specific PC-siloxane comprises carbonate units (6) derived from bisphenol A, and second repeating siloxane units (9b-2), (9b-3), (9b-4), or a combination comprising at least one of the foregoing, specifically (9b-2). This polycarbonate copolymer can comprise the siloxane units in an amount of 0.1 to 60 weight percent (wt. %), 0.5 to 55 wt. %, 0.5 to 45 wt. % 0.5 to 30 wt. %, or 0.5 to 20 wt. %, based on the total weight of the polycarbonate copolymer, with the proviso that the siloxane units are covalently bound to the polymer backbone of the polycarbonate copolymer. In an embodiment, the remaining units are bisphenol units (6). Transparency can be achieved in this embodiment when E has an average value of 4 to 50, 4 to 15, specifically 5 to 15, more specifically 6 to 15, and still more specifically 7 to 10. The transparent PC-siloxanes can be manufactured using one or both of the tube reactor processes described in U.S. Patent Application No. 2004/0039145A1 or the process described in U.S. Pat. No. 6,723,864 may be used to synthesize the poly(siloxane-carbonate) copolymers.

These and other methods for the manufacture of the PC-siloxane copolymers are known. The PC-siloxane copolymers can have an intrinsic viscosity, as determined in chloroform at 25° C., of 0.3 to 1.5 deciliters per gram (dl/g), specifically 0.45 to 1.0 dl/g. The PC-siloxane copolymers can have a weight average molecular weight ($M_w$) of 10,000 to 100,000 g/mol, as measured by gel permeation chromatography (GPC) using a cross linked styrene-divinyl benzene column, at a sample concentration of 1 milligram per milliliter, and as calibrated with polycarbonate standards.

The thermoplastic composition comprises a compatibilizer component selected from a poly(carbonate-arylate ester), a phthalimidine copolycarbonate, or a combination thereof.

A poly(carbonate-arylate ester) comprises repeating bisphenol carbonate units (6) and repeating arylate ester units of formula (10)

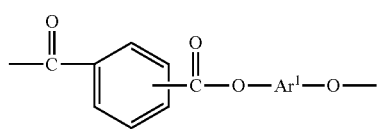

(10)

wherein $Ar^1$ is a $C_{6-32}$ hydrocarbyl group containing at least one aromatic group, e.g., a phenyl, naphthalene, anthracene, or the like. In an embodiment, $Ar^1$ is derived from an aromatic bisphenol (8), a monoaryl dihydroxy compound, or a combination comprising different bisphenol or monoaryl dihydroxy compounds. Thus, arylate ester units (10) can be derived by reaction of isophthalic acid, terephthalic acid, or a combination comprising at least one of the foregoing (referred to herein as a "phthalic acid"), with any of the aromatic bisphenols described above, a monoaryl dihydroxy compound, or a combination comprising at least one of the foregoing. The molar ratio of isophthalate to terephthalate can be 1:99 to 99:1, or 80:20 to 20:80, or 60:40 to 40:60.

The poly(carbonate-arylate ester) comprising first bisphenol carbonate units and arylate ester units (10) can be alternating or block copolymers of formula (11)

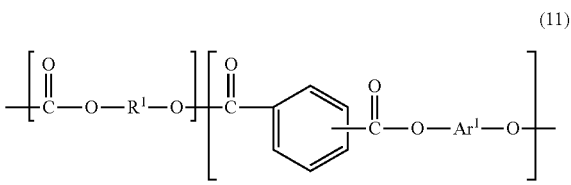

(11)

wherein $R^1$ and $Ar^1$ are as defined in formulae (7) and (10), respectively.

In general, the copolymers are block copolymers containing carbonate blocks and ester blocks. The weight ratio of total ester units to total carbonate units in the copolymers can vary broadly, for example from 99:1 to 1:99, or from 95:5 to 5:95, specifically from 90:10 to 10:90, or more specifically from 90:10 to 50:50, depending on the desired properties of the polycarbonate composition. The molar ratio of isophthalate to terephthalate in the ester units of the copolymers can also vary broadly, for example from 0:100 to 100:0, or from 92:8 to 8:92, more specifically from 98:2 to 45:55, depending on the desired properties of the polycarbonate composition. For example, the weight ratio of total ester units to total carbonate can be 99:1 to 40:60, or 90:10 to 50:40, wherein the molar ratio of isophthalate to terephthalate is from 99:1 to 40:50, more specifically 98:2 to 45:55, depending on the desired properties of the polycarbonate composition.

Additional carbonate units derived from the dihydroxy compound used to form the arylate ester units (10) can also be present as described above, for example in amounts of less than 20 mole %, less than 10 mole %, or less than 5 mole %, based on the total moles of units in the polycarbonate copolymer. It is also possible to have additional arylate ester units present derived from reaction of the phthalic acid with the dihydroxy compound used to form the carbonate units, for example in amounts of less than 20 mole %, less than 10 mole %, less than 5 mole %, or less than 1 mole % based on the total moles of units in the copolymer. In an embodiment, the combination of such additional carbonate units and such additional arylate ester units are present in an amount of less than 20 mole %, less than 10 mole %, less than 5 mole %, or less than 1 mole % based on the total moles of units in the copolymer.

A specific poly(carbonate-arylate ester) is a poly(carbonate)-co-(bisphenol arylate ester) comprising carbonate units (6), specifically bisphenol carbonate units, even more specifically bisphenol A carbonate units and repeating bisphenol arylate ester units. Bisphenol arylate units comprise residues of phthalic acid and a bisphenol, for example a bisphenol (8). In an embodiment the bisphenol arylate ester units are of formula (10a)

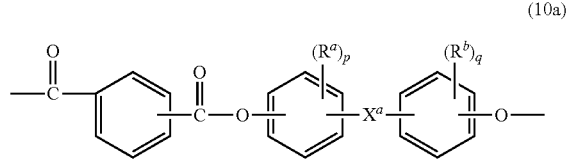

(10a)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. In an embodiment, p and q is each 0 or 1, and $R^a$ and $R^b$ are each a $C_{1-3}$ alkyl group, specifically methyl, disposed meta to the oxygen on each ring, and $X^a$ is an alkylidene of the formula —C($R^c$)($R^d$)— wherein $R^c$ and $R^d$ are each $C_{1-6}$ alkyl. The bisphenol can be bisphenol A, where p and q are both 0 and $X^a$ is isopropylidene.

In a specific embodiment, the poly(carbonate-arylate ester) is a poly(bisphenol A carbonate)-co-(bisphenol A-phthalate-ester) of formula (11a)

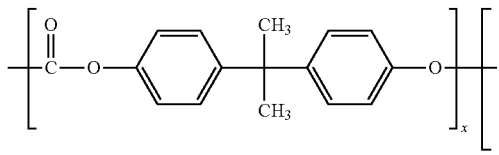

(11a)

wherein y and x represent the weight percent of arylate-bisphenol A ester units and bisphenol A carbonate units, respectively. Generally, the units are present as blocks. In an embodiment, the weight percent of ester units y to carbonate units x in the copolymers is 50:50 to 99:1, or 55:45 to 90:10, or 75:25 to 95:5. Copolymers of formula (11a) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE), and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC).

In another embodiment, a specific poly(carbonate-arylate ester) is a poly(carbonate)-co-(monoaryl arylate ester) containing carbonate units (6) and repeating monoaryl arylate ester units of formula (10b)

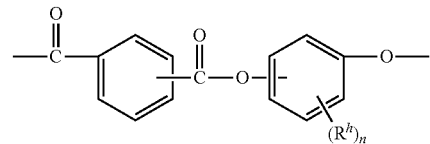

(10b)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate)-co-(monoaryl arylate ester) copolymers are of formula (11b)

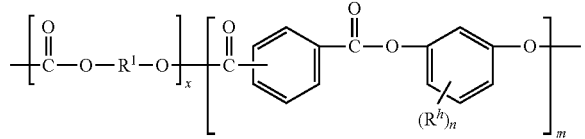

(11b)

wherein $R^1$ is as defined in formula (7) and $R^h$, and n are as defined in formula (10b), and the mole ratio of x:m is 99:1 to 1:99, specifically 80:20 to 20:80, or 60:40 to 40:60.

Specifically, the monoaryl-arylate ester unit (10b) is derived from the reaction of a combination of isophthalic and terephthalic diacids (or derivatives thereof) with resorcinol (or reactive derivatives thereof) to provide isophthalate-terephthalate-resorcinol ("ITR" ester units) of formula (10c)

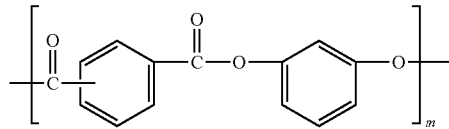
(10c)

wherein m is 4 to 100, 4 to 90, 5 to 70, more specifically 5 to 50, or still more specifically 10 to 30. In an embodiment, the ITR ester units are present in the polycarbonate copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

A specific example of a poly(carbonate)-co-(monoaryl arylate ester) is a poly(bisphenol A carbonate)-co-(isophthalate-terephthalate-resorcinol ester) of formula (11c)

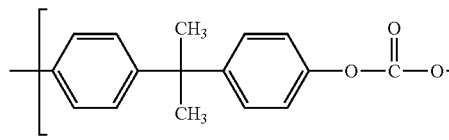
(11c)

wherein m is 4 to 100, 4 to 90, 5 to 70, more specifically 5 to 50, or still more specifically 10 to 30, and the mole ratio of x:n is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination comprising at least one of the foregoing can be present, in a total amount of 1 to 20 mole % based on the total moles of units in the copolymers, for example resorcinol carbonate units of formula (12) and bisphenol ester units of formula (10a):

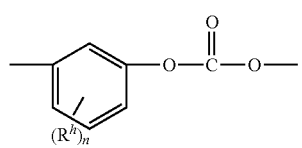
(12)

wherein, in the foregoing formula (12), $R^h$ is each independently a $C_{1-10}$ hydrocarbon group, n is 0 to 4, The bisphenol ester units can be bisphenol A phthalate ester units of the formula

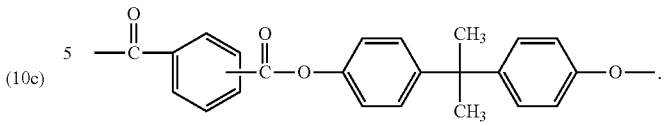
(10d)

In an embodiment, poly(bisphenol A carbonate)-co-(isophthalate-terephthalate-resorcinol ester) (11c) comprises 1 to 20 mol % of bisphenol A carbonate units, 60 to 99 mol % of isophthalic acid-terephthalic acid-resorcinol ester units, and optionally 1 to 20 mol % of resorcinol carbonate units, isophthalic acid-terephthalic acid-bisphenol A phthalate ester units, or a combination comprising at least one of the foregoing. In another embodiment, poly(bisphenol A carbonate)-co-(isophthalate-terephthalate-resorcinol ester) (11c) 70 to 90 mol % of bisphenol A carbonate units, 10 to 30 mol % of isophthalic acid-terephthalic acid-resorcinol ester units, and optionally, 1 to 60 mol % resorcinol carbonate units, isophthalic acid-terephthalic acid-bisphenol A ester units, or a combination thereof.

In another embodiment, the poly(carbonate-arylate ester) copolymers further comprise siloxane units (also known as "diorganosiloxane units"). In a specific embodiment these copolymers comprises carbonate units (6) derived from a bisphenol (8), specifically bisphenol-A; monoaryl arylate ester units (10b), and siloxane units. Still more specifically, the poly(carbonate-arylate ester) copolymers comprises bisphenol-A carbonate units, ITR ester units (10c), and siloxane units (9). For convenience, these polymers, poly(bisphenol-A carbonate)-co-poly(isophthalate-terephthalate-resorcinol ester)-co-poly(siloxane), are referred to herein as "ITR-PC-siloxane" copolymers.

The relative amount polysiloxane units (9) in the ITR-PC-siloxane copolymers depends on the desired properties of the thermoplastic composition, such as impact, smoke density, heat release, and melt viscosity. The poly(carbonate-arylate ester)s can comprise siloxane units in an amount of 0.3 to 30 weight percent (wt %), specifically 0.5 to 25 wt %, or 0.5 to 15 wt %, based on the total weight of the polymers in the thermoplastic composition, with the proviso that the siloxane units are provided by polysiloxane units covalently bonded in the polymer backbone of the poly(carbonate-arylate ester).

In an embodiment, the PC-ITR-siloxane copolymers comprise 1 to 40 mol %, or 1 to 20 mol % of bisphenol-A carbonate units, 50 to 95 mol % of ITR ester units (10c), and an amount of polysiloxane units (9b), specifically (9b-1), even more specifically (9b-2), (9b-3), (9b-4), or a combination thereof in an amount effective to provide 0.1 to 10 wt % of siloxane units, each based on the total copolymer. For example, the PC-ITR-siloxane copolymers can comprise 1 to 20 mol % of bisphenol-A carbonate units, 60 to 90 mole % of ITR ester units, and an amount of polysiloxane units (9b-2), (9b-3), or a combination thereof effective to provide 0.1 to 10 wt % of siloxane units, each based on the total copolymer.

Other carbonate units, other ester units, or a combination thereof can be present in the PC-ITR-siloxane copolymers, in a total amount of 1 to 20 mole % based on the total moles of units in the copolymers, for example resorcinol carbonate units, and bisphenol-A phthalate ester units of the formula. In an embodiment, the ITR-PC-siloxane comprises 1 to 20 mol % of bisphenol-A carbonate units, 60-98 mol % of isophthalic acid-terephthalic acid-resorcinol ester units, and optionally 1 to 20 mol % of resorcinol carbonate units (12), isophthalic acid-terephthalic acid-bisphenol-A ester units (10d), or a combination thereof, together with the siloxane units.

The polycarbonate copolymers comprising arylate ester units are generally prepared from polyester blocks. The polyester blocks can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used. The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The polycarbonate copolymers comprising arylate ester units can have an $M_w$ of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a cross linked styrene-divinyl benzene column, at a sample concentration of 1 milligram per milliliter, and as calibrated with polycarbonate standards. Samples are eluted at a flow rate of 1.0 ml/min with methylene chloride as the eluent.

The phthalimidine copolycarbonate is a copolymer comprising bisphenol carbonate units of formula (6) and phthalimidine carbonate units of formula (13)

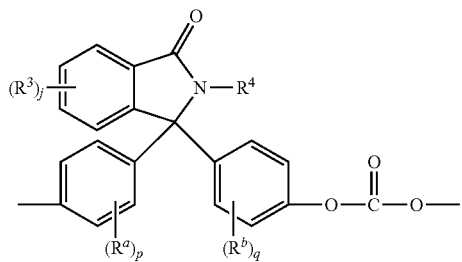

(13)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, $R^3$ is each independently a $C_{1-6}$ alkyl, j is 0 to 4, and $R^4$ is hydrogen, $C_{1-6}$ alkyl, phenyl optionally substituted with 1 to 5 $C_{1-6}$ alkyl groups. In an embodiment, $R^a$ and $R^b$ are each independently $C_{1-3}$ alkyl. For example, the phthalimidine carbonate units are of formula (13a)

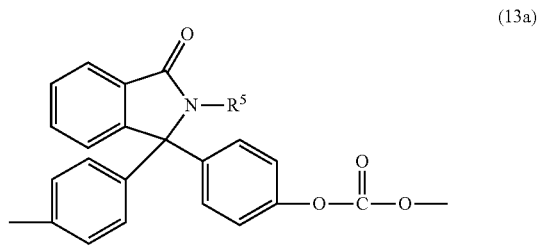

(13a)

wherein $R^5$ is hydrogen, phenyl optionally substituted with up to five $C_{1-6}$ alkyl groups, or $C_{1-4}$ alkyl. In an embodiment, $R^5$ is hydrogen, phenyl, or methyl. Carbonate units (13a) wherein $R^5$ is phenyl can be derived from 2-phenyl-3,3'-bis (4-hydroxy phenyl)phthalimidine (also known as N-phenyl phenolphthalein bisphenol, or "PPP-BP") (also known as 3,3-bis(4-hydroxyphenyl)-2-phenylisoindolin-1-one).

The relative mole ratio of first bisphenol carbonate units (6) and phthalimidine carbonate units carbonate units (13) can vary from 99:1 to 1:99, depending on the desired characteristics of the polycarbonate composition, including glass transition temperature ("Tg"), impact strength, ductility, flow, and like considerations. For example, the mole ratio of units (6):units (13) can be from 90:10 to 10:90, from 80:20 to 20:80, from 70:30 to 30:70, or from 60:40 to 40:60. When bisphenol carbonate units (6) units are derived from bisphenol A, the bisphenol A units are generally present in an amount from 50 to 99 mole %, based on the total moles of units in the polycarbonate copolymer. For example, when bisphenol carbonate units (6) are derived from bisphenol A, and bisphenol units (13) are derived from PPP-BP, the mole ration of units (4) to units (13) can be from 99:1 to 50:50, or from 90:10 to 55:45.

Polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_1$-$C_{22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxy-phenylethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

The thermoplastic compositions can include various other polymers to adjust the properties of the thermoplastic compositions, with the proviso that the other polymers are selected so as to not significantly adversely affect the desired properties of the thermoplastic composition significantly, in particular low smoke density and low heat release, as well as improved impact and ductility. For example, a combination of a polycarbonate copolymer as described above and a homopolycarbonate having repeating units (6) such as a bisphenol A homopolycarbonate can still provide thermoplastic compositions having the required low smoke density. Other polymers include an impact modifier such as natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like can be present. In general such other polymers provide less than 50 wt. %, less than 40 wt. %, less than 30 wt. %, less than 20 wt. %, or less than 10 wt. % of the total composition. In an embodiment, no other polymers are present. In a specific embodiment, no polymers containing halogen are present in the thermoplastic compositions.

The thermoplastic compositions can include various additives ordinarily incorporated into flame retardant compositions having low smoke density and low heat release, with the proviso that the additive(s) are selected so as to not adversely affect the desired properties of the thermoplastic composition significantly, in particular low smoke density and low heat release. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, additional flame retardants, impact modifiers, and anti-drip agents. A combination of additives can be used. In general, the additives are used in the amounts generally known to be effective. The total amount of additives (other than any filler or reinforcing agents) is generally 0.01 to 25 parts per hundred parts by the total weight of the polymers in the composition (PHR).

Possible fillers and reinforcing agents include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, and reinforcing organic polymer fibrous fillers, as well combinations comprising at least one of the foregoing fillers or reinforcing agents. The fillers and reinforcing agents can be surface treated with silanes to improve adhesion and dispersion within the polymer matrix. Fillers and reinforcing agents can be used in amounts of 1 to 200 parts by weight, based on 100 parts by weight of the polymer composition.

In an exemplary embodiment, glass fibers are used as the reinforcing fillers. Useful glass fibers can be formed from any type of fiberizable glass composition including those prepared from fiberizable glass compositions known as "E-glass," "A-glass," "C-glass," "D-glass," "R-glass," and "S-glass," as well as E-glass derivatives that are fluorine-free and/or boron-free. Most reinforcement mats include glass fibers formed from E-glass.

Commercially produced glass fibers generally having filament diameters of 4.0 to 35.0 micrometers may be included in the compositions. The fibers can have a round or flat cross-section. The filaments may be made by standard processes, e.g., by steam or air blowing, flame blowing, and mechanical pulling. Exemplary filaments for polymer reinforcement are often made by mechanical pulling. The glass fibers may be sized or unsized. Sized glass fibers are generally coated on at least a portion of their surfaces with a sizing composition selected for compatibility with the polymer matrix material. The sizing composition facilitates wet-out and wet-through of the organic polymer upon the fiber strands and assists in attaining selected physical properties in the composition.

The glass fibers are beneficially glass strands that have been sized. In preparing the glass fibers, a number of filaments can be formed simultaneously, sized with the coating agent, and then bundled into what is called a strand. Alternatively the strand itself can be first formed of filaments and then sized. The glass fibers can be used in lengths of 0.5 millimeter to 2 centimeters. In some embodiment, the glass fiber reinforcing agents can be used in lengths of 1 millimeter to 1 centimeter.

The reinforcing agents, specifically the glass fibers, are used in effective amounts, for example 1 to 200 parts by weight, based on 100 parts by weight of the polymer composition, more specifically 30 to 150 parts by weight, based on 100 parts by weight of the polymer composition.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 25 parts by weigh PHR.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 20 parts by weight PHR.

The use of pigments such as titanium dioxide produces white compositions, which are commercially desirable. Pigments such as titanium dioxide (or other mineral fillers) can be present in the thermoplastic compositions in amounts of 0.1 to 30 wt. %, 0.5 to 25 wt. %, 1 to 20 wt. %, or 5 to 15 wt. %, each based on the total weight of the composition.

Titanium dioxide can be coated or uncoated. In an embodiment, the titanium dioxide is an inorganic coated titanium dioxide without an organic coating. In another embodiment, the titanium dioxide is an organic coated titanium dioxide with an organic coating. The organic coating comprises polysiloxane. Coated titanium dioxide can provide improved colorability to the thermoplastic composition.

The composition can have any suitable color including white, light gray, and/or combinations thereof. The white or light gray color can exhibit an L* value greater than or equal to 80. A composition having a white or light gray color can comprise an amount of titanium dioxide in amounts of 0.1 to 30 wt. %, 0.5 to 25 wt. %, 1 to 20 wt. %, or 5 to 15 wt. %, each based on the total weight of the composition.

Light stabilizers and/or ultraviolet light (UV) absorbing additives, also referred to as UV stabilizers, can also be used. Examples of suitable UV stabilizers can include benzophenones, triazines, benzoxazinones, benzotriazoles, benzoates, formamidines, cinnamates/propenoates, aromatic propane-diones, benzimidazoles, cycloaliphatic ketones, formanilides, cyanoacrylates, benzopyranones, salicylates, and combinations comprising at least one of the foregoing.

Light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers.

UV absorbing additives include hydroxybenzophenones; hydroxybenzotriazoles; hydroxybenzotriazines; cyanoacrylates; oxanilides; benzoxazinones; aryl salicylates; monoesters of diphenols such as resorcinol monobenzoate; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); poly[(6-morphilino-s-triazine-2,4-diyl)[2,2,6,6-tetramethyl-4-piperidyl)imino]-hexamethylene[(2,2,6,6-tetramethyl-4-piperidyl)imino], 2-hydroxy-4-octyloxybenzophenone (UVINUL™3008), 6-tert-butyl-2-(5-chloro-2H-benzotriazole-2-yl)-4-methylphenyl (UVINUL™3026), 2,4-di-tert-butyl-6-(5-chloro-2H-benzotriazole-2-yl)-phenol (UVINUL™3027), 2-(2H-benzotriazole-2-yl)-4,6-di-tert-pentylphenol (UVINUL™3028), 2-(2H-benzotriazole-2-yl)-4-(1,1,3,3-tetramethylbutyl)-phenol (UVINUL™3029), 1,3-bis[(2'cyano-3',3'-diphenylacryloyl)oxy]-2,2-bis-{[(2'-cyano-3',3'-diphenylacryloyl)oxy]methyl}-propane (UVINUL™3030), 2-(2H-benzotriazole-2-yl)-4-methylphenol (UVINUL™3033), 2-(2H-benzotriazole-2-yl)-4,6-bis(1-methyl-1-phenyethyl) phenol (UVINUL™3034), ethyl-2-cyano-3,3-diphenylacrylate (UVINUL™3035), (2-ethylhexyl)-2-cyano-3,3-diphenylacrylate (UVINUL™3039), N,N'-bisformyl-N,N'-bis(2,2,6,6-tetramethyl-4-piperidinyl)hexamethylendiamine (UVINUL™4050H), bis-(2,2,6,6-tetramethyl-4-piperidyl)-sebacate (UVINUL™4077H), bis-(1,2,2,6,6-pentamethyl-4-piperdiyl)-sebacate+methyl-(1,2,2,6,6-pentamethyl-4-piperidyl)-sebacate (UVINUL™4092H) 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; TINUVIN™ 234; nano-size inorganic materials such as titanium oxide, cerium oxide, and zinc oxide, all with particle size less than or equal to 100 nanometers; or the like, or combinations comprising at least one of the foregoing UV absorbers. UV absorbers can be used in amounts of 0.01 to 1 part by weight, based on 100 parts by weight of thermoplastic and impact modifier. UV absorbers that can be particularly useful with the thermoplastic compositions disclosed herein include 2-(2H-benzotriazol-2-yl)-4-(1,1,3,3-tetramethylbutyl)-phenol (e.g., CYASORB™ 5411 commercially available from Cytec Industries, Inc., Woodland Park, N.J.) and 2,2'-(1,4-phenylene)bis(4H-3,1-benzoxazin-4-one) (e.g., CYASORB™ UV-3638, commercially available from Cytec Industries, Inc., Woodland Park, N.J.), and combinations comprising at least one of the foregoing. In another embodiment, the UV stabilizer comprises 2,2''-Methylenebis(6-(2H-benzotriazol-2-yl)-4-4(1,1,3,3,-tetramethylbutyl)phenol, available as LA-31RG having a CAS 103597-45-1; 2,2'-(p-phenylene)bis-4H-3,1-Benzoxazin-4-one", available as Cyasorb UV-3638, and having CAS:18600-59-4.

The UV stabilizers can be present in an amount of up to 5 wt. %, for example, 0.01 to 1 wt %, specifically, 0.1 to 0.5 wt %, and more specifically, 0.15 to 0.4 wt %, based upon the total weight of the thermoplastic composition.

Flame retardant salts are not needed to obtain the desired low smoke and low heat release properties. Examples of flame retardant salts include of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate (KSS); salts such as $Na_2CO_3$, $K_2CO_3$, $MgCO_3$, $CaCO_3$, and $BaCO_3$, phosphate salts, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. In an embodiment, no flame retardant salts are present. When present, flame retardant salts are present in amounts of 0.01 to 10 PHR, more specifically 0.02 to 1 PHR.

Organic flame retardants can be present, for example organic compounds that include phosphorus, nitrogen, bromine, and/or chlorine. However, halogenated flame retardants are generally avoided, such that the thermoplastic composition can be essentially free of chlorine and bromine. "Essentially free of chlorine and bromine" as used herein means having a bromine and/or chlorine content of less than or equal to 100 parts per million by weight (ppm), less than or equal to 75 ppm, or less than or equal to 50 ppm, based on the total parts by weight of the composition, excluding any filler.

In certain embodiments the thermoplastic compositions can further comprise an organophosphorus flame retardant in an amount effective to provide 0.1 to 2.0 wt. % phosphorus, based on the weight of the composition. For example, the organophosphorus compound, specifically BPADP or RDP can be present in an amount of 2 to 20 wt. %, which is effective to provide 0.1 to 2.0 wt. % phosphorus based on the total weight of the composition. Inventors have found that the presence of certain organophosphorus flame retardants for example BPADP, has a positive effect on the smoke density as it further reduced DS-values of a composition containing a polycarbonate and a second polymer, but not the flame retardant. Further, it was found that these flame retardants have a positive effect on MAHRE, as they reduce MAHRE of a composition containing a polycarbonate and a second polymer but not the flame retardants. Further, certain organophosphorus flame retardants improve the melt flow while at the same time maintain ductility even at relatively high loading levels.

Organophosphorus compounds include aromatic organophosphorus compounds having at least one organic aromatic group and at least one phosphorus-containing group, as well as organic compounds having at least one phosphorus-nitrogen bond. In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the phosphorus-containing group, or bonded via another moiety, for example an alkylene group. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol A), a monoarylene group (e.g., a 1,3-phenylene or a 1,4-phenylene), or a combination comprising at least one of the foregoing.

The phosphorus-containing group can be a phosphate $(P(\!=\!O)(OR)_3)$, phosphite $(P(OR)_3)$, phosphonate $(RP(\!=\!O)(OR)_2)$, phosphinate $(R_2P(\!=\!O)(OR))$, phosphine oxide $(R_3P(\!=\!O))$, or phosphine $(R_3P)$, wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula $(GO)_3P\!=\!O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl) p-tolyl phosphate, tritolyl phosphate, bis(2-ethylhexyl)phenyl phosphate, tri(nonylphenyl)phosphate, bis(dodecyl) p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of formula (14)

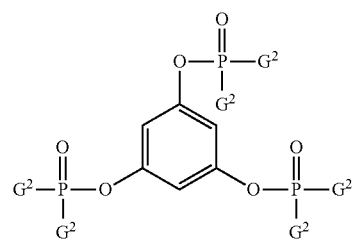

(14)

wherein each $G^2$ is independently a hydrocarbon or hydrocarbonoxy having 1 to 30 carbon atoms. In some embodiments G corresponds to a monomer used to form the polycarbonate, e.g., resorcinol.

Specific aromatic organophosphorus compounds have two or more phosphorus-containing groups, and are inclusive of acid esters of formula (15)

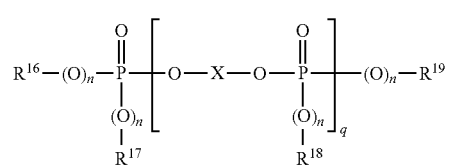

(15)

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some embodiments $R^{16}$, $R^{17}$, $R^{18}$, and $R^{19}$ are each independently $C_{1-4}$ alkyl, naphthyl, phenyl ($C_{1-4}$)alkylene, or aryl groups optionally substituted by $C_{1-4}$ alkyl. Specific aryl moieties are cresyl, phenyl, xylenyl, propylphenyl, or butylphenyl. In some embodiments X in formula (15) is a mono- or poly-nuclear aromatic $C_{6-30}$ moiety derived from a diphenol. Further in formula (15), n is each independently 0 or 1; in some embodiments n is equal to 1. Also in formula (15), q is from 0.5 to 30, from 0.8 to 15, from 1 to 5, or from 1 to 2. Specifically, X can be represented by the following divalent groups (16), or a combination comprising one or more of these divalent groups.

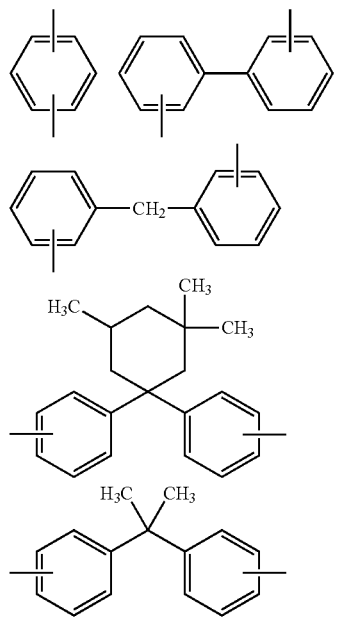

(16)

In these embodiments, each of $R^{16}$, $R^{17}$, $R^{18}$, and $R^{19}$ can be aromatic, i.e., phenyl, n is 1, and p is 1-5, specifically 1-2. In some embodiments at least one of $R^{16}$, $R^{17}$, $R^{18}$, $R^{19}$, and X corresponds to a monomer used to form the polycarbonate, e.g., bisphenol A or resorcinol. In another embodiment, X is derived especially from resorcinol, hydroquinone, bisphenol A, or diphenylphenol, and $R^{16}$, $R^{17}$, $R^{18}$, $R^{19}$, is aromatic, specifically phenyl. A specific aromatic organophosphorus compound of this type is resorcinol bis(diphenyl phosphate), also known as RDP. Another specific class of aromatic organophosphorus compounds having two or more phosphorus-containing groups are compounds of formula (17)

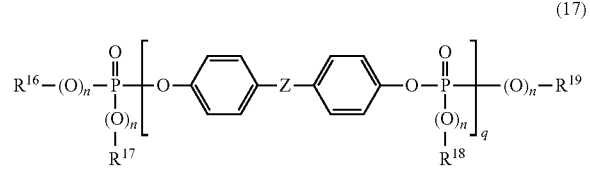

(17)

wherein $R^{16}$, $R^{17}$, $R^{18}$, $R^{19}$, n, and q are as defined for formula (19) and wherein Z is $C_{1-7}$ alkylidene, $C_{1-7}$ alkylene, $C_{5-12}$ cycloalkylidene, —O—, —S—, —SO$_2$—, or —CO—, specifically isopropylidene. A specific aromatic organophosphorus compound of this type is bisphenol A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Organophosphorus compounds containing at least one phosphorus-nitrogen bond includes phosphazenes, phosphorus ester amides, phosphoric acid amides, phosphonic acid amides, phosphinic acid amides, and tris(aziridinyl)phosphine oxide. Phosphazenes (18) and cyclic phosphazenes (19)

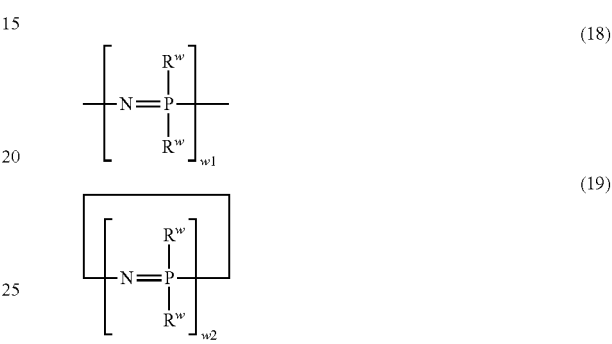

(18)

(19)

in particular can used, wherein w1 is 3 to 10,000 and w2 is 3 to 25, specifically 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

Accordingly, depending on the particular organophosphorus compound used, the thermoplastic compositions can comprise from 0.3 to 20 wt. %, or 0.5 to 15 wt. %, or 3.5 to 12 wt. % of the organophosphorus flame retardant, each based on the total weight of the composition. Specifically, the organophosphorus compounds can be bisphenol A bis (diphenyl phosphate), triphenyl phosphate, resorcinol bis (diphenyl phosphate), tricresyl phosphate, or a combination comprising at least one of the foregoing.

Methods for forming the thermoplastic compositions can vary. In an embodiment, the polymers are combined (e.g., blended) with any additives (e.g., a mold release agent) such as in a screw-type extruder. The polymers any additives can be combined in any order, and in form, for example, powder, granular, filamentous, as a masterbatch, and the like. The thermoplastic compositions can be foamed, extruded into a sheet, or optionally pelletized. Methods of foaming a thermoplastic composition using frothing or physical or chemical blowing agents are known and can be used. The pellets can be used for molding into articles, foaming, or they can be used in forming a sheet of the flame retardant thermoplastic composition. In some embodiments, the composition can be extruded (or coextruded with a coating or other layer) in the form of a sheet and/or can be processed through calendaring rolls to form the desired sheet.

As discussed above, the thermoplastic compositions are formulated to meet strict low smoke density requirements. The relative amounts of poly(etherimide), polycarbonate homopolymer, poly(carbonate-siloxane), and the polycarbonate copolymer or poly(carbonate-arylate ester) the thermoplastic compositions depends on the particular polymers, the targeted level of smoke density, and other desired properties of the thermoplastic composition, such as impact strength and flow.

The thermoplastic compositions can further have a maximum average rate of heat emission (MAHRE) of 90 kW/m$^2$ or less, or 75 kW/m$^2$ or less as measured according to ISO 5660-1 on a 3 mm thick plaque at 50 kW/m$^2$.

The thermoplastic compositions can be formulated to have lower densities, in particular a density of 1.35 g/cc or less, 1.34 g/cc or less, 1.33 g/cc or less, 1.32 g/cc or less, 1.31 g/cc or less, 1.30 g/cc or less, or 1.29 g/cc or less. The same or similar values can be obtained in components having a wide range of thicknesses, for example from 0.1 to 10 mm, or 0.5 to 5 mm.

The thermoplastic compositions can further have good melt viscosities, which aid processing. The thermoplastic compositions can have a melt volume flow rate (MVR, cubic centimeter per 10 minutes (cc/10 min) of 4 to 30, greater than or equal to 6, greater than or equal to 8, greater than or equal to 10, greater than or equal to 12, greater than or equal to 14, greater than or equal to 16, greater than or equal to 18, or greater than or equal to 20 cc/min, measured at 300° C./1.2 Kg at 360 second dwell according to ISO 1133. The same or similar values can be obtained in articles having a wide range of thicknesses, for example from 0.1 to 10 mm, or 0.5 to 5 mm.

The thermoplastic compositions can further have excellent impact properties, in particular Izod notched impact and ductility. In an embodiment, the compositions has a 50% higher notched Izod impact energy value compared to the composition without the compatibilizer component measured at 23° C. according to ISO 180/1A using a multipurpose test specimen in accordance with ISO 3167 TYPE A. The compositions can have an Izod notched impact energy of at least 30 kJ/m$^2$, at least 40 kJ/m$^2$, at least 50 kJ/m$^2$ or at least 60 kJ/m$^2$ measured at 23° C. according to ISO 180/1A using a multipurpose test specimen in accordance with ISO 3167 TYPE A. The compositions can have greater than 80% ductility measured at 23 to 0° C., according to ISO 180/1A using a multipurpose test specimen in accordance with ISO 3167 TYPE A. These values can be obtained in articles having a wide range of thicknesses, for example from 0.1 to 10 mm, or 0.5 to 5 mm, or 3 mm, or 4 mm. In some embodiments, the composition can have an Izod notched impact equal to or higher than 30 kJ/m$^2$ or 40 kJ/m$^2$ and a high ductility (80% or greater, for example 100%) at lower temperatures such as 10° C., 0° C., –10° C., –20° C., –30° C., and –50° C. The composition can have an Izod notched impact energy of at least 300 J/m, at least 400 J/m or at least 500 J/m measured at +10° C., –10° C., –30° C., or –50° C. according to ASTM D256.

The thermoplastic compositions can further have excellent impact properties, in particular multiaxial impact (MAI) and ductility. The compositions can have an MAI equal to or higher than 100 J, determined at 23° C. at an impact speed of 4.4 m/second in accordance with ISO 6603 on discs with a thickness of 3.2 mm. The compositions can have a ductility in multiaxial impact of 80% and higher, specifically 100%, determined at 23° C. at an impact speed of 4.4 m/second in accordance with ISO 6603 on discs with a thickness of 3.2 mm. These values can be obtained in articles having a wide range of thicknesses, for example from 0.1 to 10 mm, or 0.5 to 5 mm. In some embodiments, the composition can have an MAI equal to or higher than 100 J and a high ductility (80% or greater, for example 100%) at lower temperatures such as 10° C., 0° C., –10° C., –20° C. and –30° C.

The thermoplastic composition is able to be metallized with a metal such as, but not limited to aluminum, preferably wherein the aluminum is deposited and anodized to provide desirable characteristics such as corrosion resistance and wear resistance, better adhesion to paints and dyes vs. bare metal.

Shaped or molded articles comprising the thermoplastic compositions are also provided. The thermoplastic compositions can be formed into useful articles by a variety of techniques, such as injection molding, extrusion (including multilayer extrusion), rotational molding, blow molding, foaming and casting or molding, 3-dimensional printing, and thermoforming. Thus the thermoplastic compositions can be used to form a foamed article, a molded article, a thermoformed article, a printed article, an extruded sheet (which includes films), a multilayer extruded sheet, an extruded fiber or filament (for 3-dimensional printing, e.g.), one or more layers of a multi-layer article (e.g. a cap layer), a substrate for a coated article, or a substrate for a metallized article.

In an embodiment, the thermoplastic compositions are useful for the manufacture of multilayered sheets, wherein any one or more layers can comprise a composition of any one or more of the embodiments of this disclosure. For example, the multilayer sheets can comprise a first layer (e.g., a base layer) comprising a composition of any embodiments of this disclosure and a second layer (e.g., a cap layer) disposed on a side of the first layer. The second layer is selected based on the desired function and properties (e.g., transparency, weatherability, ultraviolet light resistance, scratch resistance, and the like). Exemplary materials for the cap layer include polyacetals, polyacrylonitriles, polyamides, polydienes (e.g., polybutadiene), polyethers, polyetherether ketones, polyetherimides, polyethersulfones, polyimides, polyketones, polyolefins, polysiloxanes, polystyrenes, polysulfones, polyvinyl acetates, polyvinyl chlorides, polyvinylidene chlorides, polyvinyl esters, polyvinyl ethers, polyvinyl ketones, polyvinyl pyridines, polyvinyl pyrrolidones, and the like, or a combination comprising at least one of the foregoing. Specific materials for the second layer include polyesters such as poly(ethylene terephthalate), cycloaliphatic polyester copolymers, poly((C$_{1-4}$alkylene) naphthalate), and poly(butylene terephthalate), polyfluorocarbons (e.g, poly(vinyl fluoride), poly (tetrafluoroethylene), and poly(vinylidene fluoride)) polyfluorochlorocarbons, (C$_{1-6}$alkyl)(meth)acrylates (e.g., poly(methyl methacrylate ("PMMA"), polyurethanes, acrylonitrile-butadiene-styrene (ABS), other polycarbonates, or a combination comprising at least one of the foregoing. In an embodiment, the cap layer is selected so as to not significantly adversely affect the desired properties of the compositions described herein, in particular the low smoke and flame retardant properties. In an embodiment one or more of the layers is thermoformable.

Still other layers can be present in the multilayer article as known in the art, for example various adhesive layers, primer layers, substrate layer, decorative or visual effect layer, and additional other layers. The various layers can be coextruded, laminated, or adhered to form the multilayer sheet. Generally, the overall thickness of the sheet can be, for example 1 micrometer to 1 centimeter, or 5 micrometers to 5 millimeters. More particularly, the sheet can have a thickness of 1 mil (25.4 micrometers (μm)) to 500 mils (12,700 μm), or 5 mils (127 μm) to 40 mils (1016 μm), or 5 mils (127 μm) to 30 mils (762 μm). The multilayer articles may be used for many applications, such as for skylights, signs, glazing, laminates, packaging food, clothing, pharmaceutical products, multi-wall sheets, and the like.

Illustrative articles include access panels, access doors, air flow regulators air gaspers, air grilles, arm rests, baggage storage doors, balcony components, cabinet walls, ceiling panels, door pulls, door handles, duct housing, enclosures for electronic devices, equipment housings, equipment panels, floor panels, food carts, food trays, galley surfaces, grilles, handles, housings for TVs and displays, light panels, magazine racks, telephone housings, partitions, parts for trolley carts, seat backs, seat components, railing components, seat housings, shelves, side walls, speaker housings, storage compartments, storage housings, toilet seats, tray tables, trays, trim panel, window moldings, window slides, windows, and the like.

In an embodiment, the thermoplastic compositions are formulated to provide articles that meet certain criteria set forth in the new European Railway standard EN-45545 (2013). The European Union has approved the introduction of a set of fire testing standards for the railroad industry that prescribes certain flammability, flame spread rate, heat release, smoke emission, and smoke toxicity requirements for materials used in railway vehicles, known as European Railway standard EN-45545 (2013). Based on the vehicle material, end-use, and fire risks, 26 different "Requirement" categories for materials have been established (R1-R26).

Passenger seat shells (both back and base shell) fall under the R6 application type. Lighting strips fall under the R3 application type. The R1 application type covers, amongst others, interior vertical and horizontal surfaces, such as side walls, front/end walls, doors, ceiling panels, as well as luggage racks, linings and frames.

"Hazard Levels" (HL1 to HL3) have been designated, reflecting the degree of probability of personal injury as the result of a fire. The levels are based on dwell time and are related to operation and design categories. HL1 is the lowest hazard level and is typically applicable to vehicles that run under relatively safe conditions (easy evacuation of the vehicle). HL3 is the highest hazard level and represents most dangerous operation/design categories (difficult and/or time-consuming evacuation of the vehicle, e.g. in underground rail cars). For each application category, different test requirements for the hazard levels are defined. One of the key requirements is the smoke density, measured according to ISO 5659-2 at 50 kW/m$^2$ for which the smoke density (Ds-4) values for the various hazard levels in the European Railway standard EN-45545 (2013) are shown in Table 1 for R1, R3, and R6 applications.

TABLE 1

| Hazard level | DS-4 (R1) | DS-4 (R3) | DS-4 (R6) |
| --- | --- | --- | --- |
| HL1 | 600 | 960 | 600 |
| HL2 | 300 | 480 | 300 |
| HL3 | 150 | 240 | 150 |

Another requirement for R1 and R6 applications is heat release, measured according to ISO 5660-1 at 50 kW/m$^2$, for which the maximum average rate of heat emission (MAHRE) is the key parameter. For HL2, a MAHRE of 90 kW/m$^2$ or lower is required, whereas for HL3 a MAHRE of 60 kW/m$^2$ or lower is required.

Thus, while thermoplastic compositions can be used for the manufacture of a wide variety of articles, including high occupancy structures such as rail stations, airports and office buildings, the thermoplastic compositions are especially useful for the manufacture of transportation components.

As used herein, a "transportation component" is an article or portion of an article used in rolling stock, an aircraft, a roadway vehicle, or a marine vehicle. "Rolling stock" includes but is not limited to a locomotive, coach, light rail vehicle, underground rail vehicle, tram, trolley, magnetic levitation vehicle, and a cable car. An "aircraft" includes but is not limited to a jet, an airplane, an airship, a helicopter, a balloon, and a spacecraft. A "roadway vehicle" includes but is not limited to an automobile, bus, scooter and a motorcycle. A "marine vehicle" includes but is not limited to a boat, a ship (including freight and passenger ships), jet skis, and a submarine.

Exemplary transportation components for rolling stock (e.g., trains), aircraft, and roadway and marine vehicles, particularly rolling stock, includes interior components (e.g., structure and coverings) such as ceiling paneling, flaps, boxes, hoods, louvers, insulation material and the body shell in interiors, side walls, front walls/end walls, partitions, room dividers, interior doors, interior lining of the front- and end-wall doors and external doors, luggage overhead luggage racks, vertical luggage rack, luggage container, luggage compartments, windows, window frames, kitchen interiors, surfaces, lighting components, or a component assembly comprising at least one of the foregoing. In an embodiment any of the foregoing articles are in compliance with European Rail Standard EN-45545, for example meeting R1, R3, or R6 HL-2 applications.

The thermoplastic compositions are particularly useful in train and aircraft, for example a variety of aircraft compartment interior applications, as well as interior applications for other modes of transportation, such as bus, train, subway, marine, and the like. In a specific embodiment the articles are interior components for aircraft or trains, including access panels, access doors, air flow regulators baggage storage doors, display panels, display units, door handles, door pulls, enclosures for electronic devices, food carts, food trays, grilles, handles, magazine racks, seat components, partitions, refrigerator doors, seat backs, side walls, tray tables, trim panels, lighting components, claddings, train seats or components for train seats, light housing, train luggage racks, and the like. Specifically mentioned are train seat components, e.g., arms, backs, seats, tray tables, aesthetic trim, and the like, train walls, e.g., ceiling, top wall, or sidewall claddings, aesthetic trim, and the like, and components for lightings such as strips, housings, covers, aesthetic trim, and the like. The thermoplastic compositions can be formed (e.g., molded) into sheets or other shapes that can be used for any of the above mentioned components. It is generally noted that the overall size, shape, thickness, optical properties, and the like of the thermoplastic sheet or article can vary depending upon the desired application. In an embodiment any of the foregoing articles are in compliance with European Rail Standard EN-45545, for example meeting R1, R3, or R6 HL-2 applications.

Certain of the above-described compositions are particularly useful for the manufacture of a transportation component, in particular an aircraft component or a rolling stock component (e.g., a train component) having a smoke density (Ds-4) of less than 480, or less than 300 measured in accordance with ISO 5659-2 on a 3 mm thick plaque at 50 kW/m$^2$. Such materials can be in compliance with the new EN-45545 (2013), for example meeting HL2 requirements for R1, R3, or R6 applications provided that the other required properties (e.g. heat release) meet the selection criteria as well.

The thermoplastic compositions are further illustrated by the following non-limiting examples.

EXAMPLES

Materials for the following examples are listed in Table 2. Amounts of each component in the Examples are in wt. %, based on the total weight of the composition, unless otherwise indicated.

TABLE 2

| Component | Chemical description | Source |
|---|---|---|
| PC | Bisphenol-A polycarbonate, manufactured by interfacial polymerization, Mw = 28,000 to 32,000 g/mol (determined via GPC using polycarbonate standards), manufactured by interfacial polymerization | SABIC |
| PC-Si | PDMS (polydimethylsiloxane)-bisphenol A copolymer, 6 mol % siloxane, having an average block length of 40-50 units, Mw 23,000 g/mol (determined via GPC using polycarbonate standards), manufactured by interfacial polymerization | SABIC |
| PC-Si (p) | PDMS (polydimethylsiloxane)-Bisphenol A Polycarbonate copolymer, produced via interfacial polymerization, 20 wt. % siloxane, average PDMS block length of 40-50 units, Mw about 30,000 g/mol as determined by GPC using polycarbonate standards, para-cumylphenol (PCP) end-capped | SABIC |
| PEI | Poly(etherimide) made via reaction of bisphenol-A dianhydride with equimolar amount of m-phenylene diamine, Mw = 31,000 to 35,000 g/mol (determined via GPC using polystyrene standards) | SABIC |
| PC-Ester 1 | Poly(phthalate-carbonate) copolymer, 81 mol % ester, molecular weight = 28,500 g/mol (determined via GPC using polycarbonate standards), manufactured via interfacial polymerization | SABIC |
| PC-Ester 2 | Poly(phthalate-carbonate) copolymer, 60 mol % ester, molecular weight = 28,350 g/mol (determined via GPC using polycarbonate standards), manufactured via interfacial polymerization | SABIC |
| ITR-PC 1 | ITR (Isophthalic acid-terephthalic acid-resorcinol)-bisphenol A copolyestercarbonate copolymer, ester content 83 mol %, Mw 19,000 to 23,000 g/mol, (determined via GPC using polycarbonate standards), manufactured via interfacial polymerization | SABIC |
| ITR-PC 2 | ITR (Isophthalic acid-terephthalic acid-resorcinol)-bisphenol A copolyestercarbonate copolymer, ITR content 19 mol %, Mw 29,000 to 31,000 g/mol, (determined via GPC using polycarbonate standards), manufactured via interfacial polymerization | SABIC |
| ITR-PC-Si | Polysiloxane-ITR (Isophthalic acid-terephtalic acid-resorcinol)-bisphenol-A copolyestercarbonate copolymer, ester content 83 mol %, siloxane content 1 wt % (average siloxane chain length about 10), interfacial polymerization, Mw about 24,500 g/mol, para-cumyl phenol end-capped | SABIC |
| PPPBP-BPA | N-phenylphenolphthaleinylbisphenol, 2,2-bis(4-hydro))-bisphenol-A copolymer, 32 mol % PPPBP, Mw = 23,000 to 27,000 g/mol (determined via GPC using polycarbonate standards), manufactured by interfacial polymerization | SABIC |
| Br-PC | Brominated bisphenol A polycarbonate, Br content 26 wt. %, Mw 22,000 to 26,000 g/mol, (determined via GPC using polycarbonate standards), manufactured via interfacial polymerization | SABIC |
| DMBPC-BPA | Dimethyl bisphenol cyclohexane (DMBPC)-bisphenol-A copolymer, 50 mol % DMBPC, Mw = 22,000 to 24,000 g/mol (determined via GPC using polycarbonate standards), manufactured by interfacial polymerization | SABIC |
| SA-BPA | Sebacic acid-BPA polyestercarbonate, 8.3 mol % sebacic acid, Mw = 35,500-37,500 g/mol (determined via GPC using polycarbonate standards), manufactured by interfacial polymerization | SABIC |
| PBT | Polybutylene terephthalate, PBT195, IV 0.66 | BASF |
| PET | Polyethylene terephthalate, IV 0.81 | Eastman Chemical |
| Irgafos 168 | Tris(2,4-di-(tert)-butylphenyl)phosphite | Ciba |

The tests performed are summarized in Table 3.

TABLE 3

| Description | Test | Specimen | Property | Units |
|---|---|---|---|---|
| ISO Smoke density | ISO 5659-2 | plaque 75 × 75 × 3 mm | DS-4 | [—] |
| ISO Heat release | ISO 5660-1 | Plaque 100 × 100 × 3 mm | MAHRE | kW/m$^2$ |
| Izod Notched Impact, 5.5 J, various temperatures | ISO 180/1A | Multi-purpose ISO 3167 Type A, 3 mm thick | INI 3 mm | kJ/m$^2$ |
| Izod Notched Impact, 5.5 J, various temps. | ISO 180/1A | Multi-purpose ISO 3167 Type A, 4 mm thick | INI 4 mm | kJ/m$^2$ |
| ASTM Izod Notched Impact, various temps. | ASTM D256-2010 | ASTM Impact bar, 3.2 mm thick | ASTM INI | J/m |

Smoke density measurements were performed on 7.5×7.5 cm plaques with 3 mm thickness using a National Bureau of Standards (NBS) Smoke Density Chamber from Fire Testing Technology Ltd (West Sussex, United Kingdom). All measurements were performed according to ISO5659-2, with an irradiance of 50 kW/m$^2$ at the sample position and a sample-to-cone distance of 5 cm in view of the charring behavior of the samples (as prescribed by ISO5659-2). DS-4 was determined as the measured smoke density after 240 seconds.

Heat release measurements were performed on 10×10 cm plaques with 3 mm thickness using a cone calorimeter. All tests were executed by an external test institute, namely Currenta in Leverkusen, Germany. All measurements were performed according to ISO5660-1, with an irradiance of 50 kW/m$^2$ at the sample position and a sample-to-cone distance of 6 cm in view of the charring behavior of the samples (as prescribed by ISO5660-1). The reported parameter.

Blending, Extrusion and Molding Conditions.

The compositions were made as follows. All solid additives (e.g., stabilizers, colorants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The liquid flame retardants (e.g., BPADP), when used, were fed before the vacuum using a liquid injection system. It will be recognized by one skilled in the art that the method is not limited to these temperatures or processing equipment.

Extrusion of all materials was performed on a 25 mm Werner-Pfleiderer ZAK twin-screw extruder (L/D ratio of 33:1), with a vacuum port located near the die face. The extruder has 9 zones, which were set at temperatures of 40° C. (feed zone), 200° C. (zone 1), 250° C. (zone 2), 280° C. (zone 3), and 290-310° C. (zone 4 to 8). Screw speed was 300 rpm and throughput was between 15 and 25 kg/hr.

The compositions were molded after drying at 100-110° C. for 6 hours on a 45-ton Engel molding machine with 22 mm screw or 75-ton Engel molding machine with 30 mm screw operating at a temperature 270-300° C. with a mold temperature of 70-90° C. It will be recognized by one skilled in the art that the method is not limited to these temperatures or processing equipment.

Examples 1-11

Examples 1-11 demonstrate the effect of the addition of 5 wt. % of various polycarbonates and polyesters to compositions comprising bisphenol A polycarbonate (PC), poly (carbonate-siloxane) (PC—Si) and 20% of polyetherimide (PEI). Formulations and results are shown in Table 4.

TABLE 4

| | Ex 1 | Ex 2 | Ex 3 | Ex 4 | Ex 5 | CEx 6 | CEx 7 | CEx 8 | CEx 9 | CEx 10 | CEx 11 |
|---|---|---|---|---|---|---|---|---|---|---|---|
| Components (Wt. %) | | | | | | | | | | | |
| PC | 37.5 | 37.5 | 37.5 | 37.5 | 37.5 | 37.5 | 37.5 | 37.5 | 37.5 | 37.5 | 40 |
| PC-siloxane | 37.5 | 37.5 | 37.5 | 37.5 | 37.5 | 37.5 | 37.5 | 37.5 | 37.5 | 37.5 | 40 |
| PEI | 20 | 20 | 20 | 20 | 20 | 20 | 20 | 20 | 20 | 20 | 20 |
| PC-Ester 1 | 5 | | | | | | | | | | |
| PC-Ester 2 | | 5 | | | | | | | | | |
| ITR-PC 1 | | | 5 | | | | | | | | |
| ITR-PC 2 | | | | 5 | | | | | | | |
| PPPBP-PC | | | | | 5 | | | | | | |
| Br-PC | | | | | | 5 | | | | | |
| DMBPC-PC | | | | | | | 5 | | | | |
| SA-PC | | | | | | | | 5 | | | |
| PBT | | | | | | | | | 5 | | |
| PET | | | | | | | | | | 5 | |
| Properties (4 mm) | | | | | | | | | | | |
| INI, +23° C., 5.5 J (kJ/m$^2$) | 67 | 62 | 49 | 71 | 57 | N/A | 21 | 34 | 15 | 27 | 20 |
| INI, +23° C., Ductility % | 100 | 100 | 100 | 100 | 100 | 100 | 20 | 100 | 0 | 50 | 0 |
| INI, 0° C., 5.5 J (kJ/m2) | 62 | 59 | 45 | 62 | 54 | 30 | 22 | 31 | 18 | 20 | 21 |
| INI, 0° C., Ductility % | 100 | 100 | 90 | 100 | 100 | 0 | 0 | 50 | 0 | 0 | 0 |
| INI, −10° C., 5.5 J (kJ/m$^2$) | 60 | 56 | 31 | 64 | 52 | 27 | 22 | 29 | 17 | 23 | 21 |
| INI, −10° C., Ductility (%) | 100 | 100 | 0 | 100 | 100 | 0 | 0 | 0 | 0 | 0 | 0 |
| INI, −30° C., 5.5 J (kJ/m$^2$) | 51 | 47 | 31 | 54 | 39 | 27 | 21 | 29 | 16 | 17 | 21 |
| INI, −30° C., Ductility (%) | 100 | 100 | 0 | 100 | 50 | 0 | 0 | 0 | 0 | 0 | 0 |
| INI, −50° C., 5.5 J (kJ/m$^2$) | 25 | 26 | 17 | 27 | 26 | 24 | 19 | 25 | 13 | 16 | 21 |
| INI, −50° C., Ductility (%) | 0 | 0 | 0 | 0 | 0 | 0 | 0 | 0 | 0 | 0 | 0 |
| Ds-4 (ISO 5659-2) | 186 | 191 | 160 | 199 | 233 | n.a. | n.a. | n.a. | n.a. | n.a. | 268 |

The smoke density tests executed are indicative tests. They were performed according to their respective ISO standards, but were not executed by an officially certified test institute.

The results shown in Table 4 demonstrate that addition of certain polycarbonate copolymers to the base composition results in a significant improvement in impact resistance and ductility both at room temperature and lower temperatures.

For example, the composition comprising only PC, PC—Si, and PEI has a low notched Izod impact energy resistance (20 kJ/m$^2$) at room temperature and has 0% ductility at all the tested temperatures (CEx11). Following the addition of only 5% of certain polycarbonate copolymers (e.g. PPPBP-BPA or poly(carbonate-arylate esters)) to the base composition, an improvement in notched Izod impact resistance properties is observed. For PC-esters 1 and 2, ITR-PC 1 and 2, and PPPBP-BPA (Ex1-5 respectively), the notched Izod impact energy resistance at 23° C. increased to values above 50 kJ/m$^2$ (67, 62, 49, 71 and 57 kJ/m$^2$ respectively) with 100% ductility. Furthermore, the formulations retain these high impact energy resistance levels and 100% ductility even at lower temperatures, down to −10° C.

Conversely, PBT and PET, which can form miscible blends with PEI and are partially miscible with PC, do not provide the same improvement in impact resistance properties. These results demonstrate that the improvement in impact resistance properties is not simply the result of the addition of a compatibilizer, a material that inherently has enhanced miscibility and/or compatibility with both chemical phases (e.g. PC and PEI).

Likewise, other polycarbonates, such as Br-PC, DMBPC-BPA, and SA-BPA (CExs 6-8) do not provide the same improvement in impact resistance properties. These comparative examples demonstrate that the effect observed for the polycarbonate copolymers described (e.g. PPPBP-BPA or poly(carbonate-arylate ester) copolymers) on improving impact resistance properties, is not simply due to the addition of any polycarbonates.

Furthermore, the compositions of Example 1 to 5 with 5% of compatibilizer (PC-Ester, ITR-PC, or PPPBP-PC) all have smoke density values of DS-4 measured according to ISO 5659-2 on 3 mm thick plaques at 50 kW/m$^2$ intensity below 300, which fulfills the HL2 requirements of EN45545 for e.g. R6 or R1 applications. These values are similar or even lower than the reference without compatibilizer (CEx11), which has a Ds-4 value of 268. Provided other requirements of EN45545 are met, the compositions of Example 1 to 5 can thus be used in rail interior components, while having excellent impact properties, outperforming the compositions without compatibilizer (CEx11).

Examples 12-14

These examples demonstrate the effect of the addition of certain poly(carbonate-arylate esters) to PEI/PC/PC—Si blends, on impact energy resistance, ductility and smoke density (Ds-4) as measured in accordance with ISO 5659-2. Formulations and results are shown in Table 5.

TABLE 5

| Component | Units | Ex 12 | Ex 13 | CEx 14 |
| --- | --- | --- | --- | --- |
| PEI | wt. % | 20 | 20 | 20 |
| PC | wt. % | 35 | 35 | 40 |
| PC-Si | wt. % | 35 | 35 | 40 |
| PC-ester 1 | wt. % | 10 | | |
| PC-ester 2 | wt. % | | 10 | |
| INI, +23° C., 5.5 J (4 mm) | kJ/m$^2$ | 71 | 62 | 19 |
| INI, +23° C., Ductility (4 mm) | % | 100 | 100 | 0 |
| Smoke density, DS-4 | — | 266 | 256 | 246 |

Examples 12-14 show that the addition of poly(carbonate-arylate ester) copolymers to compositions comprising PEI/PC/PC—Si, results in a significant improvement in impact resistance (as measured using notched Izod impact at room temperature) compared to the composition without the poly(carbonate-arylate ester) copolymers (CEx14), without compromising the relatively low smoke properties of the composition.

As shown in Table 5, the composition of CEx14 (PEI/PC/PC—Si blend) has a relatively low notched Izod impact resistance value at room temperature of 19 kJ/m$^2$ and 0% ductility. Addition of 10% of PC-esters 1 or 2 again results in significantly higher notched Izod impact resistance values (62-71 kJ/m$^2$) and 100% ductility (Ex12 and Ex13).

It is noted that the addition of PC-esters 1 and 2 has no significant effect on the smoke density, as the Ds-4 values remain very similar (Ds-4 of 266 and 256 for Ex12 and 13 respectively) to the compositions without the PC-ester (Ds-4 of 246), despite the relatively high smoke density of the pure PC-esters (e.g. Ds-4 of 1140 for PC-ester 2). Examples 12 and 13 have smoke density values of DS-4 measured according to ISO 5659-2 on 3 mm thick plaques at 50 kW/m$^2$ intensity below 300, which fulfills the HL2 requirements of EN45545 for e.g. R6 or R1 applications. Provided other requirements of EN45545 are met, these compositions can thus be used in rail interior components, while having excellent impact properties, outperforming the compositions without compatibilizer (CEx14).

The results shown in Table 5 demonstrate that the addition of relatively small amounts of PC-esters results in a ductile material with much better impact resistance properties while retaining relatively low smoke density properties. These compositions are suitable for EN-45545 (2013) applications, provided that the other required properties meet the requirements as well.

Examples 15-23

These examples demonstrate the effect of the amount of certain poly(carbonate-arylate esters) added to PEI/PC/PC—Si blends, on notched Izod impact resistance and ductility. Formulations and results are shown in Table 6.

TABLE 6

| | | Ex 15 | Ex 16 | Ex 17 | Ex 18 | Ex 19 | Ex 20 | Ex 21 | Ex 22 | CEx 23 |
| --- | --- | --- | --- | --- | --- | --- | --- | --- | --- | --- |
| Components | | | | | | | | | | |
| PEI | % | 20 | 20 | 20 | 20 | 20 | 20 | 20 | 20 | 20 |
| PC | % | 39.75 | 39.5 | 39 | 38.5 | 37.5 | 36.25 | 35 | 32.5 | 40 |
| PC-Si | % | 39.75 | 39.5 | 39 | 38.5 | 37.5 | 36.25 | 35 | 32.5 | 40 |
| PC-Ester 1 | % | 0.5 | 1 | 2 | 3 | 5 | 7.5 | 10 | 15 | |
| Properties | | | | | | | | | | |
| INI, +23° C., 5.5 J (4 mm) | kJ/m$^2$ | 52 | 61 | 64 | 64 | 67 | 69 | 68 | 70 | 20 |
| INI, +23° C., Ductility (4 mm) | % | 100 | 100 | 100 | 100 | 100 | 100 | 100 | 100 | 0 |
| INI, 0° C., 5.5 J (4 mm) | kJ/m$^2$ | 51 | 57 | 61 | 63 | 62 | 63 | 64 | 64 | 21 |
| INI, 0° C., Ductility (4 mm) | % | 100 | 100 | 100 | 100 | 100 | 100 | 100 | 100 | 0 |
| INI, −10° C., 5.5 J (4 mm) | kJ/m$^2$ | 50 | 54 | 55 | 56 | 60 | 63 | 61 | 59 | 21 |
| INI, −10° C., Ductility (4 mm) | % | 100 | 100 | 100 | 100 | 100 | 100 | 100 | 100 | 0 |
| INI, −30° C., 5.5 J (4 mm) | kJ/m$^2$ | 41 | 47 | 49 | 49 | 51 | 50 | 35 | 26 | 21 |
| INI, −30° C., Ductility (4 mm) | % | 70 | 80 | 80 | 80 | 80 | 80 | 50 | 40 | 0 |
| INI, −50° C., 5.5 J (4 mm) | kJ/m$^2$ | 28 | 31 | 31 | 30 | 25 | 28 | 23 | 20 | 21 |
| INI, −50° C., Ductility (4 mm) | % | 0 | 0 | 0 | 0 | 0 | 0 | 0 | 0 | 0 |
| DS-4, ISO 5659-2 | — | n.a. | n.a. | n.a. | n.a. | 186 | n.a. | 266 | 185 | 268 |

Figure 2:
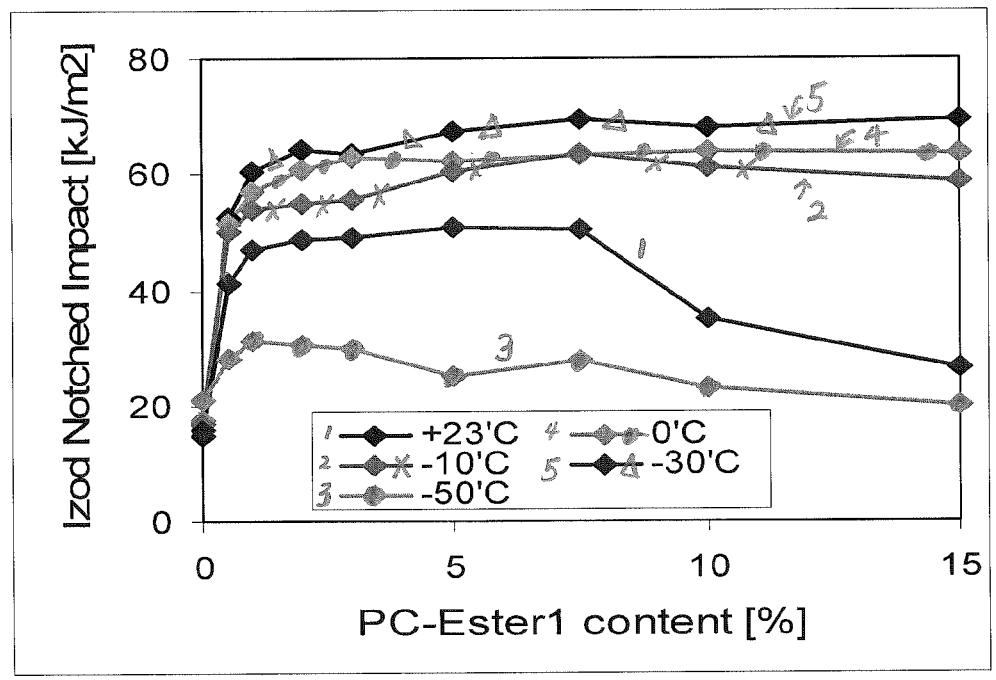
FIG. 2 shows the effect of addition of increasing amounts of poly(carbonate-arylate ester) to a polyetherimide/polycarbonate homopolymer/poly(carbonate-siloxane) combination on notched Izod impact resistance measured at various temperatures according to ISO 180/1A using a multipurpose test specimen in accordance with ISO 3167 TYPE A.

As shown in Table 6 and illustrated in FIG. 2, the addition of 0.5-15 wt. % of PC-Ester 1 significantly improves impact resistance properties over the composition without PC-Ester 1.

For example, with PC-Ester 1, the notched impact resistance at +23° C. is 50 to 70 kJ/m$^2$ (Ex15-22). In contrast, without PC-Ester 1, the notched impact resistance at +23° C. is 20 kJ/m$^2$ (CEx 23). In all cases, high notched Izod impact resistance of no less than 50 kJ/m$^2$ and 100% ductility is retained at temperatures as low as −10° C. (compared to 21 kJ/m$^2$ for CEx23). At −30° C. all examples still have significantly higher notched impact energy resistance than the composition without PC-ester 1 (CEx23).

The compositions of Example 19, 21 and 22, having 5, 10 and 15% of PC-Ester1 as compatibilizer respectively, all have smoke density values of DS-4 measured according to ISO 5659-2 on 3 mm thick plaques at 50 kW/m$^2$ intensity below 300, which fulfills the HL2 requirements of EN45545 for e.g. R6 or R1 applications. These values are similar or even lower than the reference without compatibilizer (CEx23), which has a Ds-4 value of 268. Based on interpolation of this smoke density data, it can be reasonably expected that the all compositions containing PC-Ester values between 0.5 and 15% (Examples 15 to 21) have such smoke density Ds-4 values below 300. Provided other requirements of EN45545 are met, the compositions of Example 15 to 21 can thus be used in rail interior components, while having excellent impact properties, outperforming the compositions without compatibilizer (CEx23).

Comparative Examples 24-25

Examples 24-25 show the effect of adding poly(carbonate-arylate ester) copolymers to compositions with different polycarbonate in the base composition. Formulations and results are shown in Table 7.

TABLE 7

|  | Units | CEx 24 | CEx 25 |
| --- | --- | --- | --- |
| Components |  |  |  |
| PEI | wt. % | 20 | 20 |
| Br-PC | wt. % | 42 | 48 |
| PC-Si | wt. % | 28 | 32 |
| PC-Ester 1 | wt. % | 10 |  |
| Properties |  |  |  |
| INI, +23° C., 5.5 J (4 mm) | kJ/m$^2$ | 7 | 7 |
| INI, +23° C., Ductility (4 mm) | % | 0 | 0 |
| INI, +10° C., 5.5 J (4 mm) | kJ/m$^2$ | 7 | 8 |
| INI, +10° C., Ductility (4 mm) | % | 0 | 0 |
| INI, 0° C., 5.5 J (4 mm) | kJ/m$^2$ | 7 | 8 |
| INI, 0° C., Ductility (4 mm) | % | 0 | 0 |
| INI, −10° C., 5.5 J (4 mm) | kJ/m$^2$ | 7 | 7 |
| INI, −10° C., Ductility (4 mm) | % | 0 | 0 |
| INI, −30° C., 5.5 J (4 mm) | kJ/m$^2$ | 7 | 7 |
| INI, −30° C., Ductility (4 mm) | % | 0 | 0 |
| INI, −50° C., 5.5 J (4 mm) | kJ/m$^2$ | 7 | 7 |
| INI, −50° C., Ductility (4 mm) | % | 0 | 0 |
| Ductile-to-Brittle transition temperature | ° C. | >+23 | >+23 |

As shown in Table 7, PC-ester 1 does not seem to exert any positive effect upon addition to a composition containing Br-PC, PC—Si, and PEI (CEx24 vs. CEx25). CEx24 and CEx25 demonstrate that the positive effect of the PC-copolymers (e.g. PPPBP-PC or poly(carbonate-arylate ester) copolymers) on the impact properties, does not necessarily translate to any composition containing a polycarbonate and PEI.

Examples 26-33

Examples 26-33 compare the impact properties and tensile modulus of compositions containing PC, PC—Si (p), PEI, Irgafos 168, and PPC or ITR-PC—Si (FST), with and without TiO$_2$ with different loadings. Formulations and results are shown in Table 8.

TABLE 8

|  | Units | Ex 26 | Ex 27 | Ex 28 | Ex 29 | Ex 30 | Ex 31 | Ex 32 | Ex 33 |
| --- | --- | --- | --- | --- | --- | --- | --- | --- | --- |
| Components |  |  |  |  |  |  |  |  |  |
| PC | parts by wt | 67.5 | 61.5 | 55.5 | 55.5 | 52.5 | 46.5 | 40.5 | 40.5 |
| PC-Si (p) | parts by wt | 17.5 | 17.5 | 17.5 | 17.5 | 17.5 | 17.5 | 17.5 | 17.5 |
| PEI | parts by wt | 10 | 10 | 10 | 10 | 25 | 25 | 25 | 25 |
| Irgafos 168 | parts by wt | 0.1 | 0.1 | 0.1 | 0.1 | 0.1 | 0.1 | 0.1 | 0.1 |
| PPC | parts by wt | 5 | 5 | 5 |  | 5 | 5 | 5 |  |
| ITR-PC-Si | parts by wt |  |  |  | 5 |  |  |  | 5 |
| TiO2 | parts by wt |  | 6 | 12 | 12 |  | 6 | 12 | 12 |
| Properties |  |  |  |  |  |  |  |  |  |
| IZOD ISO 3 mm RT energy | kJ/m2 | 61 | 56 | 51 | 41 | 55 | 48 | 42 | 33 |
| IZOD ISO 3 mm 10° C. energy | kJ/m2 | 59 | 52 | 48 | 39 | 50 | 44 | 40 | 33 |
| IZOD ISO 3 mm 0° C. energy | kJ/m2 | 56 | 50 | 45 | 37 | 49 | 43 | 38 | 31 |
| IZOD ISO 3 mm −10° C. energy | kJ/m2 | 56 | 48 | 44 | 35 | 46 | 40 | 36 | 29 |
| IZOD ISO 3 mm −30° C. energy | kJ/m2 | 52 | 43 | 40 | 32 | 41 | 37 | 31 | 25 |
| IZOD ISO 3 mm −50° C. energy | kJ/m2 | 44 | 37 | 35 | 28 | 34 | 31 | 27 | 20 |
| IZOD ASTM RT energy | J/m | 754 | 666 | 579 | 488 | 680 | 590 | 524 | 559 |
| IZOD ASTM 10° C. energy | J/m | 745 | 653 | 560 | 468 | 650 | 557 | 501 | 512 |
| IZOD ASTM 0° C. energy | J/m | 714 | 618 | 527 | 433 | 609 | 524 | 453 | 484 |
| IZOD ASTM −10° C. energy | J/m | 679 | 592 | 516 | 419 | 571 | 488 | 427 | 436 |
| IZOD ASTM −30° C. energy | J/m | 620 | 543 | 462 | 368 | 503 | 437 | 381 | 399 |
| IZOD ASTM −50° C. energy | J/m | 568 | 461 | 400 | 340 | 408 | 334 | 301 | 297 |
| Tensile modulus | MPa | 2127 | 2099 | 2064 | 2065 | 2233 | 2200 | 2162 | 2208 |
| Stress at Yield | MPa | 59 | 56 | 54 | 54 | 61 | 58 | 56 | 59 |
| Stress at Break | MPa | 64 | 62 | 58 | 60 | 63 | 54 | 51 | 61 |
| Strain at Yield | % | 6 | 6 | 5 | 5 | 5 | 5 | 5 | 6 |
| Strain at Break | % | 98 | 98 | 90 | 92 | 79 | 49 | 31 | 70 |

The addition of TiO$_2$ decreases the impact properties of the compatibilized compositions somewhat compared to compositions that do not contain TiO$_2$. But good impact energy levels at low temperatures can still be achieved.

Example 35

Example 35 show the effect of adding an organic phosphate flame retardant (BPADP) to the compositions of the invention on the smoke density and heat release properties. Formulations and results are shown in Table 9.

TABLE 9

|  | Units | Ex 35 |
|---|---|---|
| Components |  |  |
| PEI | wt. % | 20 |
| PC | wt. % | 34.7 |
| PC-Si | wt. % | 34.7 |
| PC-Ester 1 | wt. % | 5 |
| BPADP | wt. % | 3.5 |
| Additives | wt. % | 2.1 |
| Properties |  |  |
| DS-4 | — | 270 |
| MAHRE | kW/m$^2$ | 80 |

As shown in Table 9, Example 35 has a smoke density Ds-4 of 270, measured according to ISO 5659-2 on 3 mm thick plaques at 50 kW/m$^2$ intensity and a MAHRE heat release of 80 kW/m$^2$, measured according to ISO 5660-1 on 3 mm thick plaques at 50 kW/m$^2$ intensity, which fulfills the HL2 requirements of EN45545 for R6 R1 applications. This shows that BPADP can be added to further improve the properties of such compositions.

Examples 36-39

Examples 36-39 compare the impact properties of compositions containing PC—Si and 10% PEI, with and without 5% compatibilizer. Formulations and results are shown in Table 10.

TABLE 10

|  |  | CEx 36 | CEx 37 | Ex 38 | Ex 39 |
|---|---|---|---|---|---|
| Components |  |  |  |  |  |
| PC-Si | % | 89.9 | 84.9 | 84.9 | 84.9 |
| ITR-PC-Si | % |  |  | 5 |  |
| PC-Ester 1 | % |  |  |  | 5 |
| PEI | % |  | 10 | 10 | 10 |
| Irgafos 168 | % | 0.1 | 0.1 | 0.1 | 0.1 |
| Properties |  |  |  |  |  |
| IZOD ISO 3 mm RT energy | kJ/m2 | 27 | 36 | 51 | 51 |
| IZOD ISO 3 mm 10° C. energy | kJ/m2 | 23 | 34 | 50 | 50 |
| IZOD ISO 3 mm 0° C. energy | kJ/m2 | 19 | 31 | 49 | 49 |
| IZOD ISO 3 mm −10° C. energy | kJ/m2 | 18 | 28 | 46 | 46 |
| IZOD ISO 3 mm −30° C. energy | kJ/m2 | 16 | 20 | 41 | 41 |
| IZOD ISO 3 mm −50° C. energy | kJ/m2 | 14 | 18 | 20 | 20 |
| IZOD ASTM RT energy | J/m | 260 | 432 | 628 | 628 |
| IZOD ASTM 10° C. energy | J/m | 225 | 409 | 604 | 604 |
| IZOD ASTM 0° C. energy | J/m | 199 | 389 | 602 | 602 |
| IZOD ASTM −10° C. energy | J/m | 181 | 384 | 578 | 578 |
| IZOD ASTM −30° C. energy | J/m | 169 | 355 | 559 | 559 |
| IZOD ASTM −50° C. energy | J/m | 147 | 262 | 440 | 440 |

The composition containing only PC—Si has good impact properties (CEx36) with high impact energy values at −30° C. at 3 mm ISO testing and at −30° C. ASTM testing. The addition of 10% PEI (CEx37) results in significant loss in impact properties and low impact energy values even at room temperature compared to the composition containing only PC—Si.

The addition of compatibilizers to the composition containing PC—Si and 10% PEI, using 5% ITR-PC—Si (Ex38) and 5% PC-Ester1 (Ex39) results in significant improvements in impact properties compared to the composition without compatibilizer (CEx37). PC-Ester1 (Ex39) is more efficient at improving impact properties, and has high energy values at −30° C. at 3 mm ISO testing and at −30° C. ASTM testing, similar to the composition only containing PC—Si (CEx36). ITR-PC—Si also improves impact properties compared to CEx1, but less efficient than PC-Ester1.

These results demonstrate that the addition of PC-Ester1 or ITR-PC—Si results in a significantly improved balance of impact properties in compositions containing PC—Si and 10% of PEI.

Examples 40-47

Examples 40-47 compare the impact properties of compositions containing PC—Si and 25% PEI, with and without compatibilizer with different loadings. Formulations and results are shown in Table 11.

TABLE 11

|  |  | CEx 40 | CEx 41 | Ex 42 | Ex 43 | Ex 44 | Ex 45 | Ex 46 | Ex 47 |
|---|---|---|---|---|---|---|---|---|---|
| Components |  |  |  |  |  |  |  |  |  |
| PC-Si | % | 99.9 | 74.9 | 69.9 | 58.2 | 69.9 | 69.9 | 58.2 | 69.9 |
| ITR-PC-Si | % |  |  | 5 | 10 | 16.7 |  |  |  |
| PC-Ester 1 | % |  |  |  |  |  | 5 | 10 | 16.7 |
| PEI | % |  | 25 | 25 | 25 | 25 | 25 | 25 | 25 |
| Irgafos 168 | % | 0.1 | 0.1 | 0.1 | 0.1 | 0.1 | 0.1 | 0.1 | 0.1 |
| Properties |  |  |  |  |  |  |  |  |  |
| IZOD ISO 3 mm RT energy | kJ/m$^2$ | 54 | 10 | 17 | 35 | 74 | 45 | 47 | 49 |
| IZOD ISO 3 mm 10° C. energy | kJ/m$^2$ | 55 | 9 | 16 | 27 | 60 | 43 | 45 | 46 |
| IZOD ISO 3 mm 0° C. energy | kJ/m$^2$ | 53 | 9 | 16 | 24 | 22 | 40 | 43 | 43 |
| IZOD ISO 3 mm −10° C. energy | kJ/m$^2$ | 49 | 10 | 16 | 22 | 18 | 36 | 40 | 41 |
| IZOD ISO 3 mm −30° C. energy | kJ/m$^2$ | 40 | 8 | 14 | 16 | 14 | 25 | 27 | 22 |
| IZOD ISO 3 mm −50° C. energy | kJ/m$^2$ | 17 | 9 | 13 | 14 | 11 | 18 | 18 | 16 |

TABLE 11-continued

|  |  | CEx 40 | CEx 41 | Ex 42 | Ex 43 | Ex 44 | Ex 45 | Ex 46 | Ex 47 |
|---|---|---|---|---|---|---|---|---|---|
| IZOD ASTM RT energy | J/m | 719 | 96 | 168 | 445 | 740 | 594 | 642 | 681 |
| IZOD ASTM 10° C. energy | J/m | 660 | 92 | 152 | 290 | 789 | 572 | 596 | 644 |
| IZOD ASTM 0° C. energy | J/m | 673 | 91 | 158 | 260 | 372 | 548 | 574 | 590 |
| IZOD ASTM −10° C. energy | J/m | 663 | 92 | 158 | 225 | 304 | 529 | 547 | 599 |
| IZOD ASTM −30° C. energy | J/m | 595 | 90 | 153 | 195 | 184 | 443 | 511 | 457 |
| IZOD ASTM −50° C. energy | J/m | 206 | 92 | 143 | 143 | 125 | 279 | 266 | 196 |

The composition containing only PC—Si has good impact properties (CEx40) with high impact energy values at −30° C. at 3 mm ISO testing and at −30° C. ASTM testing. The addition of 25% PEI (CEx41) results in significant loss in impact properties and low impact energy values even at room temperature compared to the composition containing only PC—Si.

The addition of compatibilizers to the composition containing PC—Si and 25% PEI, using ITR-PC—Si (Ex42-44) and PC-Ester1 (Ex45-47) results in significant improvements in impact properties compared to the composition without compatibilizer (CEx41). PC-Ester1 (Ex45-47) is more efficient at improving impact properties, and has high energy values at −10° C. at 3 mm ISO testing and at −30° C. ASTM testing, at any loading between 5% and 16.7%. ITR-PC—Si also improves impact properties compared to CEx41, but less efficient than PC-Ester1, as 5% (Ex42) is not sufficient to achieve high energy values in ISO or ASTM testing at room temperature, and the low temperature impact at 10% and 16.7% loading (Ex43 and 44) is lower than in the case of using PC-Ester 1 (Ex45-47).

These results demonstrate that the addition of PC-Ester1 or ITR-PC—Si results in a significantly improved balance of impact properties in compositions containing PC—Si and 25% of PEI.

Examples 48-50

Examples 48-50 compare the impact properties of compositions containing PC—Si and 40% PEI, with and without compatibilizer with different loadings. Formulations and results are shown in Table 12.

TABLE 12

|  |  | CEx 48 | Ex 49 | Ex 50 |
|---|---|---|---|---|
| Components |  |  |  |  |
| PC-Si | % | 59.9 | 54.9 | 49.9 |
| PC-Ester 1 | % |  | 5 | 10 |
| PEI | % | 40 | 40 | 40 |
| Irgafos 168 | % | 0.1 | 0.1 | 0.1 |
| TiO2 |  |  |  |  |
| Properties |  |  |  |  |
| IZOD ISO 3 mm RT energy | kJ/m² | 10 | 20 | 12 |
| IZOD ISO 3 mm 10° C. energy | kJ/m² | 10 | 26 | 11 |
| IZOD ISO 3 mm 0° C. energy | kJ/m² | 10 | 13 | 12 |
| IZOD ISO 3 mm −10° C. energy | kJ/m² | 10 | 13 | 11 |
| IZOD ISO 3 mm −30° C. energy | kJ/m² | 9 | 10 | 11 |
| IZOD ISO 3 mm −50° C. energy | kJ/m² | 8 | 10 | 8 |
| IZOD ASTM RT energy | J/m | 89 | 694 | 757 |
| IZOD ASTM 10° C. energy | J/m | 94 | 577 | 337 |
| IZOD ASTM 0° C. energy | J/m | 84 | 157 | 145 |
| IZOD ASTM −10° C. energy | J/m | 86 | 129 | 115 |
| IZOD ASTM −30° C. energy | J/m | 81 | 131 | 106 |
| IZOD ASTM −50° C. energy | J/m | 85 | 89 | 80 |
| Sunscreen, 0.5% strain, 24 hr, YS % | % | NA | NA | NA |
| Sunscreen, 0.5% strain, 24 hr, EB % | % | NA | NA | NA |
| Sunscreen, 1% strain, 24 hr, YS % | % | 100 | 100 | 99 |
| Sunscreen, 1% strain, 24 hr, EB % | % | 79 | 99 | 88 |
| Sunscreen, 1% strain, 120 hr, YS % | % | 99 | 100 | 99 |
| Sunscreen, 1% strain, 120 hr, EB % | % | 102 | 100 | 99 |

The composition containing PC—Si and 40% PEI (CEx48) has poor impact properties and low impact energy values even at room temperature.

The addition of 5% (Ex49) or 10% (Ex50) PC-Ester 1 as compatibilizer to the composition containing PC—Si and 40% PEI, results in significant improvements in impact properties compared to the composition without compatibilizer (CEx48), mainly in ASTM impact, achieving significantly higher impact energy values compared to CEx48 over the whole temperature range, and high energy values as low as 10'C. These results demonstrate that the addition of PC-Ester1 results in a significantly improved balance of impact properties in compositions containing PC—Si and 40% PEI.

Set forth below are some embodiments of the polycarbonate compositions, methods of manufacture and articles comprising the same.

In an embodiment, a thermoplastic composition comprises, based on the total weight of the thermoplastic composition, 10 to 45 wt. % of a poly(etherimide); 35 to 90 wt. % of a polycarbonate component comprising a polycarbonate homopolymer, a poly(carbonate-siloxane), or a combination thereof; 0.5 to 20 wt. % of a compatibilizer polycarbonate component comprising a poly(carbonate-arylate ester), a phthalimidine copolycarbonate, or a combination thereof; up to 5 wt. % of an ultraviolet light stabilizer; and 0 to 20 wt. % of $TiO_2$; wherein a sample of the composition has a 50% higher notched Izod impact energy value compared to the composition without the compatibilizer component measured at 23° C. according to ISO 180/1A using a multipurpose test specimen in accordance with ISO 3167 TYPE A.

In another embodiment, a composition comprises, based on the weight of the composition: 10 to 30 wt. % of a poly(etherimide); 30 to 50 wt. % of a polycarbonate homopolymer; 30 to 50 wt. % of a poly(carbonate-siloxane) copolymer; and 0.5 to 15 wt. % of compatibilizer polycarbonate component comprising a poly(carbonate-arylate ester), a phthalimidine copolycarbonate, or a combination thereof; wherein a sample of the composition has a notched Izod impact value of greater than or equal to 30 kJ/m², measured at 23° C. according to ISO 180/1A using a multipurpose test specimen in accordance with ISO 3167 TYPE A; greater than 80% ductility measured at 23 to 0° C., according to ISO 180/1A using a multipurpose test specimen in accordance with ISO 3167 TYPE A; and a smoke density after 4 minutes (DS-4) of less than or equal to 300 determined according to ISO 5659-2 on a 3 mm thick plaque at 50 kW/m$^2$.

In another embodiment, the composition has a heat release (MAHRE) of less than or equal to 90 kW/m$^2$ determined according to ISO 5660-1 on a 3 mm thick plaque at 50 kW/m$^2$ The polyetherimide of the thermoplastic compositions comprises units of the formula (1). In specific embodiments, R is meta-phenylene, para-phenylene, or a combination thereof; and Z is 2,2'-bis(4-phenylene)propane.

The polycarbonate homopolymer comprises repeating units of the formula (6), preferably the repeating units are bisphenol A carbonate units.

The poly(carbonate-siloxane) comprises first repeating units and second repeating units, wherein the first repeating units are bisphenol carbonate units of the formula (6) and the second repeating units are polysiloxane units of the formula (9), preferably formula (9b-1), more preferably formula (9b-2), (9b-3), (9b-4), or a combination thereof.

The poly(carbonate-arylate ester) comprises bisphenol A carbonate units (6), for example, bisphenol A carbonate units and arylate ester units of the formula (10a). Examples of the poly(carbonate-arylate ester) include a poly(bisphenol A carbonate)-co-(bisphenol phthalate ester) comprising 55 to 65 wt. % of the ester units, wherein the ester units have a molar ratio of isophthalate to terephthalate of 45:55 to 55:45; and a poly(bisphenol A carbonate)-co-(bisphenol phthalate ester) comprising 75 to 85 wt. % of the ester units, wherein the ester units have a molar ratio of isophthalate to terephthalate of 98:2 to 88:12.

Alternatively, the poly(carbonate-arylate ester) comprises bisphenol A carbonate units, arylate ester units of the formula (10b), optionally, monoaryl carbonate units of the formula (12), and optionally, bisphenol ester units of the formula (10a). Examples of the poly(carbonate-arylate ester) include: (1) a copolymer comprising 70 to 90 mol % of bisphenol A carbonate units, 10 to 30 mol % of isophthalic acid-terephthalic acid-resorcinol ester units, and optionally, 1 to 60 mol % resorcinol carbonate units, isophthalic acid-terephthalic acid-bisphenol A ester units, or a combination thereof; and (2) a copolymer comprising 1 to 20 mol % of bisphenol A carbonate units, 60 to 99 mol % of isophthalic acid-terephthalic acid-resorcinol ester units, and optionally, 1 to 20 mol % resorcinol carbonate units, isophthalic acid-terephthalic acid-bisphenol A ester units, or a combination thereof.

The poly(carbonate-arylate ester) can further comprise siloxane units as described herein in the context of poly(carbonate-siloxane). For example, a poly(carbonate-arylate ester) can comprise bisphenol A carbonate units; isophthalic acid-terephthalic acid-resorcinol ester units; and siloxane units (9b-2), (9b-3), (9b-4), or a combination comprising at least one of the foregoing. An example of the poly(carbonate-arylate ester) comprises: 1 to 40 mol % of the bisphenol A carbonate units, 50 to 95 mol % of isophthalic acid-terephthalic acid-resorcinol units, and the siloxane units in an amount effective to provide 0.1 to 10 wt % of siloxane units (9b-2), (9b-3), (9b-4), or a combination comprising at least one of the foregoing, based on the weight of the poly(carbonate-ester-siloxane).

The phthalimidine copolycarbonate comprises first repeating units and second repeating units different from the first repeating units, wherein the first repeating units are phthalimidine carbonate units of the formula (13) or (13a) and the second repeating units comprise bisphenol carbonate units that are not the same as the first repeating phthalimidine carbonate units.

Optionally the compositions of any one of the above embodiment further comprise an additive selected from a processing aid, a heat stabilizer, an ultraviolet light absorber, a colorant, a flame retardant, an impact modifier, or a combination comprising at least one of the foregoing. For example, the compositions comprise, based on the total weight of the compositions, from 0.0001 to 30 wt. % of each additive present in the compositions. In an embodiment, the compositions comprise one or more of the following: (1) $TiO_2$; (2) a reinforcing agent, which can comprise glass fibers, preferably in an amount from 1 to 200 parts by weight based on 100 parts by weight of the polymers, wherein the glass fibers have a round or flat cross-section; or (3) an aromatic organophosphorus compound having at least one organic aromatic group and at least one phosphorus-containing group, or an organic compound having at least one phosphorus-nitrogen bond.

In specific embodiments, the organophosphorus compound is bisphenol A bis(diphenyl phosphate), triphenyl phosphate, resorcinol bis(diphenyl phosphate), tricresyl phosphate, a phenol/bi-phenol polyphosphate, or a combination comprising at least one of the foregoing. The organophosphorus compound containing a nitrogen-phosphorus bond is a phosphazene, phosphorus ester amide, phosphoric acid amide, phosphonic acid amide, phosphinic acid amide, tris(aziridinyl)phosphine oxide, a combination comprising at least one of the foregoing, where the composition has a smoke density after 4 minutes (DS-4) of less than or equal to 300 determined according to ISO 5659-2 on a 3 mm thick plaque at 50 kW/m$^2$ and a heat release (MAHRE) of less than or equal to 90 kW/m$^2$ determined according to ISO 5660-1 on a 3 mm thick plaque at 50 kW/m$^2$.

One or more of the following conditions can apply to the composition of the foregoing embodiments: the composition has an Izod notched impact energy of at least 35 kJ/m$^2$ measured at +10° C. according to ISO 180 on 3 mm thick ISO impact bars; the composition has an Izod notched impact energy of at least 35 kJ/m$^2$ measured at −10° C. according to ISO 180 on 3 mm thick ISO impact bars; the composition has an Izod notched impact energy of at least 30 kJ/m$^2$ measured at −30° C. according to ISO 180 on 3 mm thick ISO impact bars; the composition has an Izod notched impact energy of at least 30 kJ/m$^2$ measured at −50° C. according to ISO 180 on 3 mm thick ISO impact bars; or the composition has a smoke density after 4 minutes (DS-4) of less than or equal to 300 determined according to ISO 5659-2 on a 3 mm thick plaque at 50 kW/m$^2$.

In an embodiment, a composition comprises, based on the total weight of the composition: 10 to 25 wt. % of a polyetherimide; 35 to 42 wt. % of a poly(bisphenol-A carbonate) homopolymer; 35 to 42 wt. % of a poly(carbonate-siloxane); 0.5 to 15 wt. % of a phthalimidine copolycarbonate; up to 5 wt. % of an ultraviolet light stabilizer; 0 to 20 wt. % of $TiO_2$; and optionally, up to 5 wt. % of an additive selected from a processing aid, a heat stabilizer, a dye, a flame retardant, an impact modifier, or a combination comprising at least one of the foregoing, wherein the poly(carbonate-siloxane) comprises bisphenol A carbonate units, and siloxane units of the formulas (9b-2), (9b-3), (9b-4), or a combination comprising at least one of the foregoing, wherein E has an average value of 2 to 200, wherein the poly(carbonate-siloxane) comprises 0.5 to 55 wt. % of siloxane units based on the total weight of the poly(carbonate-siloxane), wherein the phthalimidine copolycarbonate comprises bisphenol A carbonate units, and carbonate units of the formula (13a); wherein $R^5$ is hydrogen, $C_{1-6}$ alkyl, or phenyl optionally substituted with 1 to 5 $C_{1-6}$ alkyl groups; and wherein a sample of the composition has a notched Izod impact of greater than or equal to 40 kJ/m², measured at 23° C. to −30° C. according to ISO 180/1A using a multipurpose test specimen in accordance with ISO 3167 TYPE A, and a smoke density after 4 minutes (DS-4) of less than or equal to 300 determined according to ISO 5659-2 on a 3 mm thick plaque at 50 kW/m².

In another embodiment, a composition comprises, based on the total weight of the composition: 10 to 25 wt. % of a polyetherimide; 35 to 42 wt. % of a poly(bisphenol-A carbonate) homopolymer; 35 to 42 wt. % of a poly(carbonate-siloxane); 0.5 to 15 wt. % of a poly(carbonate-arylate ester); up to 5 wt. % of an ultraviolet light stabilizer; 0 to 20 wt. % of $TiO_2$; and optionally, up to 5 wt. % of an additive selected from a processing aid, a heat stabilizer, a dye, a flame retardant, an impact modifier, or a combination comprising at least one of the foregoing, wherein the poly(carbonate-siloxane) comprises bisphenol A carbonate units, and siloxane units of the formula (9b-2), (9b-3), (9b-4), or a combination comprising at least one of the foregoing, wherein E has an average value of 2 to 200, wherein the poly(carbonate-siloxane) comprises 0.5 to 55 wt. % of dimethylsiloxane units based on the total weight of the poly(carbonate-siloxane), wherein the poly(carbonate-arylate ester) is a poly(bisphenol A carbonate)-co-(bisphenol phthalate ester) comprising 55 to 65 wt. % of the ester units, wherein the ester units have a molar ratio of isophthalate to terephthalate of 45:55 to 55:45, or a poly(bisphenol A carbonate)-co-(bisphenol phthalate ester) comprising 75 to 85 wt. % of the ester units, wherein the ester units have a molar ratio of isophthalate to terephthalate of 98:2 to 88:12, or a combination thereof, and wherein a sample of the composition has a notched Izod impact of greater than or equal to 50 kJ/m², measured at 23° C. to −30° C., according to ISO 180/1A using a multipurpose test specimen in accordance with ISO 3167 TYPE A, and a smoke density after 4 minutes (DS-4) of less than or equal to 300 determined according to ISO 5659-2 on a 3 mm thick plaque at 50 kW/m².

In another embodiment, a composition comprises, based on the total weight of the composition: 10 to 25 wt. % of a polyetherimide; 35 to 42 wt. % of a poly(bisphenol-A carbonate) homopolymer; 25 to 42 wt. % of a poly(carbonate-siloxane); 0.5 to 15 wt. % of a poly(carbonate-arylate ester); up to 5 wt. % of an ultraviolet light stabilizer; 0 to 20 wt. % of $TiO_2$; and optionally, up to 5 wt. % of an additive selected from a processing aid, a heat stabilizer, a dye, a flame retardant, an impact modifier, or a combination comprising at least one of the foregoing, wherein the poly(carbonate-siloxane) comprises bisphenol A carbonate units, and siloxane units of the formula (9b-2), (9b-3), (9b-4), or a combination comprising at least one of the foregoing, wherein E has an average value of 2 to 200, wherein the poly(carbonate-siloxane) comprises 0.5 to 55 wt. % of siloxane units based on the total weight of the poly(carbonate-siloxane), wherein the poly(carbonate-arylate ester) comprises 70 to 90 mol % of bisphenol A carbonate units, 10 to 30 mol % of isophthalic acid-terephthalic acid-resorcinol ester units, and optionally, 1 to 60 mol % resorcinol carbonate units, isophthalic acid-terephthalic acid-bisphenol A ester units, or a combination thereof, and wherein a sample of the composition has a Notched Izod impact of greater than or equal to 50 kJ/m², measured at 23° C. to −30° C., according to ISO 180/1A using a multipurpose test specimen in accordance with ISO 3167 TYPE A, and a smoke density after 4 minutes (DS-4) of less than or equal to 300 determined according to ISO 5659-2 on a 3 mm thick plaque at 50 kW/m².

An article selected from a molded article, a thermoformed article, an extruded film, an extruded sheet, an extruded fiber or filament, a foamed article, one or more layers of a multi-layer article, a substrate for a coated article, and a substrate for a metallized article comprising the composition of any one of above embodiments. In an embodiment, a multilayer sheet comprises a first layer comprising a composition of any one of claims 1 to 19; and a second polymer layer disposed on a side of the base layer, preferably wherein the cap layer comprises poly(ethylene terephthalate), poly (vinyl fluoride), poly(vinylidene fluoride), or a combination comprising at least one of the foregoing.

At least one of the following conditions can apply: the article is a transportation component; the article is a marine vehicle, or aircraft interior partition, a train, a marine vehicle, or aircraft seat back, a component of a train, a marine vehicle, or aircraft tray table, a food tray, a train, a marine vehicle, or aircraft interior trim panel, a train, a marine vehicle, or aircraft interior display panel, a train, a marine vehicle, or interior side wall, a component of a train, a marine vehicle, or aircraft baggage storage door, an enclosure for an electronic device, a display unit, or television housing, a component of a food cart, a component of a refrigerator door, a component of magazine rack, a handle, an automobile grille, a component of an air flow regulator, and an aircraft, a marine vehicle, or train interior part or seat component; the article comprises a train seat component, a train wall component, a train luggage rack, or a train lighting component; or the component is a housing, a frame, a clip, a bezel, a bushing, a flange, a strut, a prong, a fin, or a rib; the article is an automobile interior component selected from trim, an air outlet, a button, a ventilator, an instrument panel, a lens, or a cover.

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Unless otherwise indicated, groups that can be present on a "substituted" position include cyano; hydroxyl; nitro; azido; alkanoyl (such as a $C_{2-6}$ alkanoyl group); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; C1-6 or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:
1. A thermoplastic composition comprising, based on the total weight of the thermoplastic composition,
    10 to 45 wt. % of a poly(etherimide);
    35 to 90 wt. % of a polycarbonate component comprising a poly(carbonate-siloxane), or a combination of a poly- carbonate homopolymer and the poly(carbonate-siloxane);
    0.5 to 20 wt. % of a compatibilizer polycarbonate component comprising a poly(carbonate-arylate ester), a phthalimidine copolycarbonate, or a combination thereof;
    up to 5 wt. % of an ultraviolet light stabilizer; and
    0 to 20 wt. % of $TiO_2$;
    wherein a sample of the composition has
    a 50% higher notched Izod impact energy value compared to the composition without the compatibilizer polycarbonate component measured at 23° C. according to ISO 180/1A using a multipurpose test specimen in accordance with ISO 3167 TYPE A.
2. The composition of claim 1 comprising, based on the weight of the composition:
    10 to 30 wt. % of a poly(etherimide);
    30 to 50 wt. % of a polycarbonate homopolymer;
    30 to 50 wt. % of a poly(carbonate-siloxane) copolymer; and
    0.5 to 15 wt. % of compatibilizer polycarbonate component comprising a poly(carbonate-arylate ester), a phthalimidine copolycarbonate, or a combination thereof;
    wherein a sample of the composition has
    a notched Izod impact value of greater than or equal to 30 $kJ/m^2$, measured at 23° C. according to ISO 180/1A using a multipurpose test specimen in accordance with ISO 3167 TYPE A;
    greater than 80% ductility measured at 23 to 0° C., according to ISO 180/1A a using multipurpose test specimen in accordance with ISO 3167 TYPE A; and
    a smoke density after 4 minutes (DS-4) of less than or equal to 300 determined according to ISO 5659-2 on a 3 mm thick plaque at 50 $kW/m^2$.
3. The composition of claim 1, wherein the polyetherimide comprises units of the formula

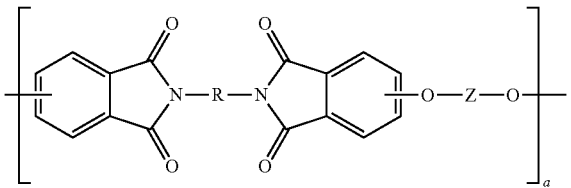

wherein
    R is a $C_{2-20}$ hydrocarbon group, and
    Z is an aromatic $C_{6-24}$ monocyclic or polycyclic group which is unsubstituted or substituted with 1 to 6 $C_{1-8}$ alkyl groups, 1 to 8 halogen atoms, or a combination thereof, wherein the divalent bonds of the —O—Z—O— group are in the 3,3',3,4',4,3', or the 4,4' positions.
4. The composition of claim 1, wherein polycarbonate homopolymer comprises bisphenol A carbonate units.
5. The composition of claim 1, wherein the poly(carbonate-siloxane) comprises first repeating units and second repeating units, wherein the first repeating units are bisphenol carbonate units of the formula

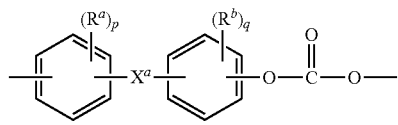

wherein
R$^a$ and R$^b$ are each independently C$_{1-12}$ alkyl, C$_{2-12}$ alkenyl, C$_{3-8}$ cycloalkyl, or C$_{1-12}$ alkoxy,
p and q are each independently 0 to 4, and
X$^a$ is a single bond, —O—, —S—, —S(O)—, —S(O)$_2$—, —C(O)—, a C$_{1-10}$ alkylidene of formula —C(R$^c$)(R$^d$)— wherein R$^c$ and R$^d$ are each independently hydrogen or C$_{1-10}$ alkyl, or a group of the formula —C(=R$^e$)— wherein R$^e$ is a divalent C$_{1-10}$ hydrocarbon group; and the second repeating units are polysiloxane units of the formula

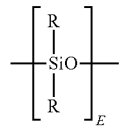

wherein
R is each independently a C$_{1-13}$ monovalent hydrocarbon group, and
E has an average value of 2 to 200.

6. The composition of claim 5, wherein the siloxane units are of the formula

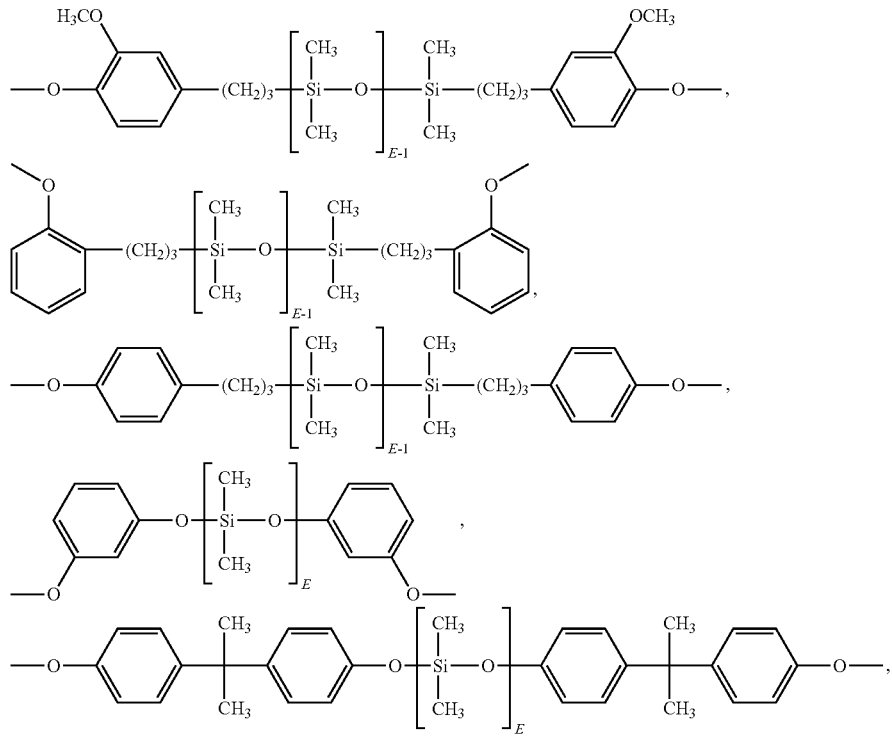

or a combination comprising at least one of the foregoing, wherein E has an average value of 2 to 200, wherein the poly(carbonate-siloxane) comprises 0.5 to 55 wt. % of siloxane units based on the total weight of the poly(carbonate-siloxane).

7. The composition of claim 1, wherein the compatibilizer polycarbonate component comprises a poly(carbonate-arylate ester) comprising bisphenol A carbonate units and arylate ester units of the formula

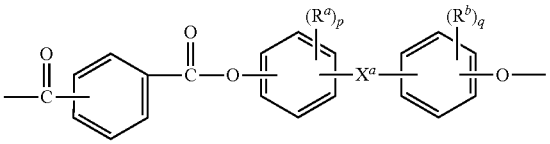

wherein
R$^a$ and R$^b$ are each independently C$_{1-12}$ alkyl, C$_{2-12}$ alkenyl, C$_{3-8}$ cycloalkyl, or C$_{1-12}$ alkoxy,
p and q are each independently 0 to 4, and
X$^a$ is a single bond, —O—, —S—, —S(O)—, —S(O)$_2$—, —C(O)—, a C$_{1-10}$ alkylidene of the formula —C(R$^c$)(R$^d$)— wherein R$^c$ and R$^d$ are each independently hydrogen or C$_{1-10}$ alkyl, or a group of the formula —C(=R$^e$)— wherein R$^e$ is a divalent C$_{1-10}$ hydrocarbon group.

8. The composition of claim 7, wherein the poly(carbonate-arylate ester) is a poly(bisphenol A carbonate)-co-(bisphenol phthalate ester) comprising 55 to 65 wt. % of the ester units, wherein the ester units have a molar ratio of isophthalate to terephthalate of 45:55 to 55:45; or the poly(carbonate-arylate ester) is a poly(bisphenol A carbonate)-co-(bisphenol phthalate ester) comprising 75 to 85 wt. % of the ester units, wherein the ester units have a molar ratio of isophthalate to terephthalate of 98:2 to 88:12.

9. The composition of claim 1, wherein the compatibilizer polycarbonate component is a poly(carbonate-arylate ester) comprising bisphenol A carbonate units, arylate ester units of the formula

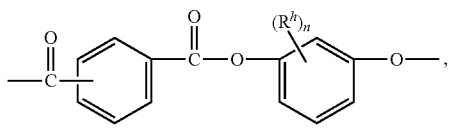

wherein, in the foregoing formulae
$R^h$ is each independently a $C_{1-10}$ hydrocarbon group,
n is 0 to 4.

10. The composition of claim 9, wherein the poly(carbonate-arylate ester) comprises:
70 to 90 mol % of bisphenol A carbonate units, and
10 to 30 mol % of isophthalic acid-terephthalic acid-resorcinol ester units.

11. The composition of claim 9, wherein the poly(carbonate-arylate ester) comprises:
1 to 20 mol % of bisphenol A carbonate units,
60 to 99 mol % of isophthalic acid-terephthalic acid-resorcinol ester units.

12. The composition of claim 9, wherein the poly(carbonate-arylate ester) further comprises siloxane units of the formula

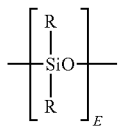

wherein
each R is independently a $C_{1-13}$ monovalent hydrocarbon group, and
E has an average value of 2 to 500.

13. The composition of claim 12, wherein the siloxane units are of the formula or a combination comprising at least one of the foregoing, wherein E has an average value of 2 to 200.

14. The composition of claim 12, wherein the poly(carbonate-arylate ester) comprises:
1 to 40 mol % of the bisphenol A carbonate units,
50 to 95 mol % of isophthalic acid-terephthalic acid-resorcinol units, and
the siloxane units in an amount effective to provide 0.1 to 10 wt % of siloxane units, based on the weight of the poly(carbonate-ester-siloxane).

15. The composition of claim 1, wherein the compatibilizer polycarbonate component comprises a phthalimidine copolycarbonate comprising first repeating units and second repeating units different from the first repeating units, wherein
the first repeating units are phthalimidine carbonate units of the formula

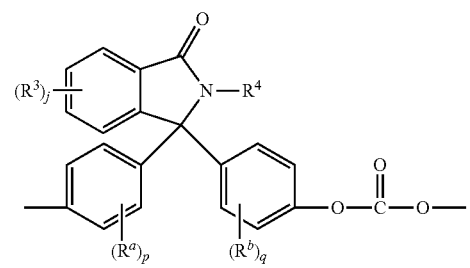

wherein
$R^a$ and $R^b$ are each independently a $C_{1-12}$ alkyl, $C_{2-12}$ alkenyl, $C_{3-8}$ cycloalkyl, or $C_{1-12}$ alkoxy,
p and q are each independently 0 to 4,

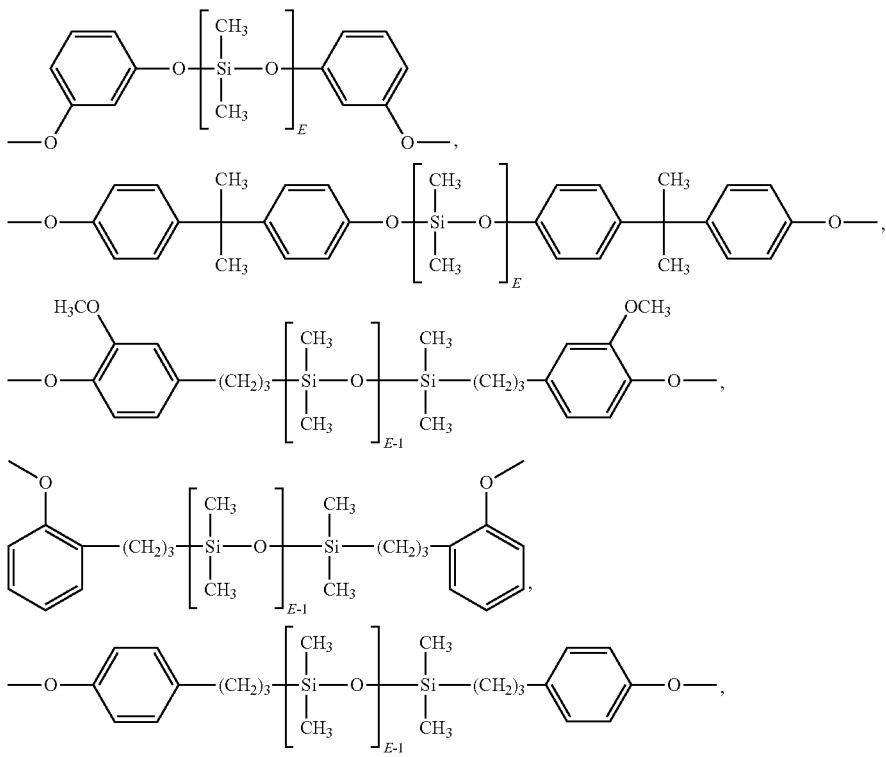

each $R^3$ is independently a $C_{1-6}$ alkyl,
j is 0 to 4, and
$R^4$ is hydrogen, $C_{1-6}$ alkyl, unsubstituted phenyl, or phenyl substituted with 1 to 5 $C_{1-6}$ alkyl groups, and
the second repeating units comprise bisphenol carbonate units that are not the same as the first repeating phthalimidine carbonate units.

16. The composition of claim 1, further comprising an additive selected from a processing aid, a heat stabilizer, an ultraviolet light absorber, a colorant, a flame retardant, an impact modifier, or a combination comprising at least one of the foregoing.

17. The composition of claim 16, wherein the additive comprises $TiO_2$.

18. The composition of claim 1, further comprising an aromatic organophosphorus compound having at least one organic aromatic group and at least one phosphorus-containing group, or an organic compound having at least one phosphorus-nitrogen bond.

19. The composition of claim 1 further comprising a reinforcing agent.

20. The composition of claim 1, having a heat release (MAHRE) of less than or equal to 90 kW/m² determined according to ISO 5660-1 on a 3 mm thick plaque at 50 kW/m².

21. An article selected from a molded article, a thermoformed article, an extruded sheet, an extruded fiber or filament, a cast sheet, a foamed article, one or more layers of a multi-layer article, a substrate for a coated article, and a substrate for a metallized article comprising the composition of claim 1.

22. The article of claim 21, wherein the article is a railway interior component, selected from a seat component, primary seat structure, seat shell, seat back, seat pan, table tray, head rest, privacy divider, center console, arm rest, leg rest, food tray, end bay, shroud, kick panel, foot well, literature pocket, monitor, bezel, line replaceable unit, foot bar, luggage rack, luggage container, luggage compartment, floor and wall composite, air duct, strip, device for passenger information, window frame, interior lining, side wall, front wall, end wall, partition, room divider, flap, box, hood, louvre, interior door, lining for internal and external door, ceiling paneling, electrical and lighting component.

23. The article of claim 21, wherein the article is an aircraft interior component, selected from a profile, panel, panel insert, air flow regulator, call button, oxygen system housing, oxygen system cover, window frame, window housing, lighting rail, grip rail, passenger service unit component, luggage bin component, profile, washing table, side wall component, food tray, in-flight entertainment housing, display bezel, crew communication device component, seat component, side-arm panel, literature pocket, tray table, monitor cover, kick panel, tray table arm, foot rests seat arm, headrest, electronic housing, air ducting component, grill, panel fixation, cable bracket, door handle, hinge, trolley component or connector.

24. A method of manufacture of an article, comprising molding, extruding, 3-dimensional printing, or casting the composition of claim 1 to form the article.

25. A multilayer sheet or film comprising:
a first layer comprising the composition of claim 1; and
a second polymer layer disposed on a side of the first layer.

26. The composition of claim 9, wherein the poly(carbonate-arylate ester) further comprises monoaryl carbonate units, bisphenol ester units, or a combination thereof; and wherein the monoaryl carbonate units have the formula

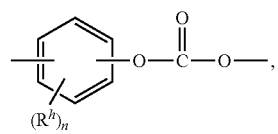

and
the bisphenol ester units have the formula

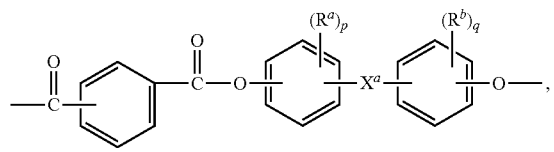

wherein, in the foregoing formulas
$R^h$ is each independently a $C_{1-10}$ hydrocarbon group,
$R^a$ and $R^b$ are each independently a $C_{1-12}$ alkyl,
p and q are each independently integers of 0 to 4, and
$X^a$ is a single bond, —O—, —S—, —S(O)—, —S(O)$_2$—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group.

27. The composition of claim 10, wherein the poly (carbonate-arylate ester) further comprises 1 to 60 mol % resorcinol carbonate units, isophthalic acid-terephthalic acid-bisphenol A ester units, or a combination thereof.

28. The composition of claim 11, wherein the poly(carbonate-arylate ester) further comprises 1 to 20 mol % resorcinol carbonate units, isophthalic acid-terephthalic acid-bisphenol A ester units, or a combination thereof.

29. The composition of claim 19, wherein the reinforcing agent comprises glass fibers in an amount from 1 to 200 parts by weight based on 100 parts by weight of the polymers.

30. The composition of claim 1, further comprising bisphenol A bis(diphenyl phosphate), triphenyl phosphate, resorcinol bis(diphenyl phosphate), tricresyl phosphate, a phenol/bi-phenol polyphosphate, a nitrogen-phosphorus bond is a phosphazene, phosphorus ester amide, phosphoric acid amide, phosphonic acid amide, phosphinic acid amide, tris(aziridinyl)phosphine oxide, or a combination comprising at least one of the foregoing.

* * * * *